US010798886B2

(12) United States Patent
Russell

(10) Patent No.: US 10,798,886 B2
(45) Date of Patent: Oct. 13, 2020

(54) SYSTEMS AND METHODS FOR WATER HARVESTING AND RECYCLING

(71) Applicant: Austin Russell, Newport Beach, CA (US)

(72) Inventor: Austin Russell, Newport Beach, CA (US)

( * ) Notice: Subject to any disclaimer, the term of this patent is extended or adjusted under 35 U.S.C. 154(b) by 0 days.

(21) Appl. No.: 15/831,199

(22) Filed: Dec. 4, 2017

(65) Prior Publication Data

US 2018/0220600 A1  Aug. 9, 2018

Related U.S. Application Data

(62) Division of application No. 13/010,451, filed on Jan. 20, 2011, now Pat. No. 9,832,939.

(60) Provisional application No. 61/297,197, filed on Jan. 21, 2010.

(51) Int. Cl.
| | | |
|---|---|---|
| *A01G 25/00* | (2006.01) | |
| *E03B 1/04* | (2006.01) | |
| *C02F 1/28* | (2006.01) | |
| *C02F 1/32* | (2006.01) | |
| *C02F 1/68* | (2006.01) | |

(52) U.S. Cl.
CPC ................ *A01G 25/00* (2013.01); *E03B 1/04* (2013.01); *C02F 1/283* (2013.01); *C02F 1/32* (2013.01); *C02F 1/68* (2013.01); *C02F 2209/42* (2013.01); *C02F 2303/04* (2013.01)

(58) Field of Classification Search
CPC ............ A01G 25/00; C02F 1/283; C02F 1/32
See application file for complete search history.

(56) References Cited

U.S. PATENT DOCUMENTS

| | | | |
|---|---|---|---|
| 4,334,386 A | | 6/1982 | Burcombe et al. |
| 4,934,404 A | * | 6/1990 | DeStefano ............. A01G 25/00 137/357 |
| 4,971,690 A | * | 11/1990 | Justice .................... C02F 3/046 210/170.08 |
| 5,192,426 A | | 3/1993 | DeCoster et al. |
| 5,217,042 A | | 6/1993 | Delle Cave |
| 5,234,286 A | | 8/1993 | Wagner |
| 5,322,387 A | | 6/1994 | Heine et al. |
| 5,342,144 A | | 8/1994 | McCarthy |
| 5,403,498 A | | 4/1995 | Morrissey et al. |

(Continued)

FOREIGN PATENT DOCUMENTS

| | | |
|---|---|---|
| JP | 5304845 | 11/1993 |
| JP | 6306894 | 11/1994 |

(Continued)

*Primary Examiner* — Vincent H Tran
(74) *Attorney, Agent, or Firm* — Knobbe, Martens, Olson & Bear, LLP

(57) ABSTRACT

This disclosure describes a system for recycling and reusing water from sprinkler systems to water or irrigate a yard or an area of land. The system includes a water reclamation tank that stores water captured from beneath the area of land. When it is time to water the area of land, the sprinkler system draws water from the water reclamation tank. A portion of this water is then recaptured and supplied back to the water reclamation tank for further storage until the next time the sprinkler system is activated. This cyclical process occurs repeatedly and enables a significant reduction in the amount of freshly supplied water used to maintain the area of land.

4 Claims, 17 Drawing Sheets

(56) References Cited

U.S. PATENT DOCUMENTS

| | | | |
|---|---|---|---|
| 6,234,711 B1 | 5/2001 | Beaman | |
| 6,277,274 B1 * | 8/2001 | Coffman | B01D 24/205 |
| | | | 210/150 |
| 6,382,237 B1 * | 5/2002 | Takai | E03B 3/02 |
| | | | 137/236.1 |
| 6,406,627 B1 * | 6/2002 | Wallace | C02F 3/00 |
| | | | 210/602 |
| 6,419,422 B1 | 7/2002 | Wachtel | |
| 6,436,283 B1 | 8/2002 | Duke | |
| 6,547,488 B2 | 4/2003 | Imbrigiotta | |
| 6,863,805 B1 * | 3/2005 | Barreras, Sr. | B01D 21/0006 |
| | | | 210/143 |
| 7,029,586 B2 | 4/2006 | Austin | C02F 3/10 |
| | | | 210/170.08 |
| 7,207,748 B1 | 4/2007 | Urban | |
| 9,832,939 B2 * | 12/2017 | Russell | A01G 25/00 |
| 2006/0124540 A1 * | 6/2006 | Austin | C02F 3/06 |
| | | | 210/602 |
| 2007/0272616 A1 * | 11/2007 | Young | B01D 21/003 |
| | | | 210/716 |
| 2008/0098652 A1 * | 5/2008 | Weinbel | A01G 25/06 |
| | | | 47/1.01 F |
| 2009/0187382 A1 * | 7/2009 | Conroy | G05B 23/0267 |
| | | | 702/188 |
| 2009/0242492 A1 | 10/2009 | Ruskin | |
| 2010/0122944 A1 * | 5/2010 | Williamson | C02F 1/001 |
| | | | 210/88 |
| 2010/0140193 A1 * | 6/2010 | Hsu | E03B 3/32 |
| | | | 210/807 |
| 2010/0204924 A1 * | 8/2010 | Wolfe | C02F 1/008 |
| | | | 702/25 |
| 2011/0088315 A1 * | 4/2011 | Donoghue | A01G 25/16 |
| | | | 47/48.5 |
| 2011/0166848 A1 * | 7/2011 | McCarthy | A01G 25/16 |
| | | | 703/22 |
| 2011/0174706 A1 | 7/2011 | Russell | |
| 2011/0210049 A1 * | 9/2011 | O'Regan, Jr. | G05B 19/4185 |
| | | | 210/85 |

FOREIGN PATENT DOCUMENTS

| | | |
|---|---|---|
| JP | 2001073415 | 3/2001 |
| JP | 2006274701 | 10/2006 |
| JP | 2008080305 | 4/2008 |

* cited by examiner

| Observation | Units | Day 0 | Day 1 | Day 2 | Day 3 | Day 4 | Day 5 | Day 6 | Day 7 | Daily Average |
|---|---|---|---|---|---|---|---|---|---|---|
| Water Level | (quarts) | 8 | 7 127/128 | 7 631/640 | 7 39/40 | 7 619/640 | 7 241/251 | 7 19/20 | 7 151/160 | The water level dropped 0.0083 quarts per day |
| Overall Water Saved | (%) | 100 | 99.9023 | 99.8242 | 99.6875 | 99.5898 | 99.502 | 99.375 | 99.2969 | 0.1042% of the 8 quarts of water was lost every day |
| Grass Growth | (inches) | 1 | 1 1/32 | 1 1/8 | 1 9/29 | 1 3/5 | 1 2/3 | 1 3/4 | 1 7/8 | The grass grew 0.1548 inches per day |
| Water Clarity | (clarity/color) | clear | transparent /very pale yellow | slightly translucent /pale yellow | slightly translucent /yellow | slightly translucent /yellow | translucent /yellow-light brown | translucent /yellow-light brown | translucent /gold | The water became slightly darker yellow/ underwent a mild clarity loss each day |
| Water Saved v. Current Method | (quarts) | 0 | 43.2909 | 86.5142 | 129.4666 | 172.6222 | 215.5876 | 258.3748 | 301.2003 | Saves an average of 43.0324 quarts every day of use |

FIG. 1B

SYSTEMS AND METHODS FOR WATER HARVESTING AND RECYCLING

REFERENCE TO RELATED APPLICATION

This application is a divisional of U.S. patent application Ser. No. 13/010,451, filed Jan. 20, 2011, and entitled "SYSTEMS AND METHODS FOR WATER HARVESTING AND RECYCLING," which claims priority to U.S. Provisional Application No. 61/297,197, filed Jan. 21, 2010, and entitled "SYSTEMS AND METHODS FOR WATER HARVESTING AND RECYCLING," the entire contents of each of which are hereby incorporated by reference herein.

BACKGROUND

Field

The present disclosure relates to systems and methods for water and resource management. More specifically, the systems and methods of the present disclosure provide for advantageous water harvesting and recycling.

Description of the Related Art

Fresh water is a precious resource and is necessary for the survival of humans and other life forms. Approximately 97 percent of Earth's water is salt water located in the oceans. Only about 3 percent of Earth's water is fresh. Of that 3 percent, 75 percent is found in the masses of ice near the poles. A minute amount is found in the atmosphere as water vapor. Less than 1 percent of the water on this planet is generally available for human use.

In semi-arid regions, such as Southern California, the fresh drinking water supply is reaching a critical point. In Southern Calif., for example, the Metropolitan Water District (MWD) imports water from the Colorado River and Northern California through the Sacramento-San Joaquin Delta. As of Dec. 2008, the MWD's water supply reserves were at approximately 1,770,000 acre-feet. A natural process of recharging generally replaces underground water with surface water when water enters an aquifer (an underground layer of rock or soil that holds water) from the surface. Too often, the MWD's water supply reserves reaches dangerously low levels and serious concerns exist about whether the water supply can be sufficiently recharged given current demands.

In other words, at current demand levels, combined natural and man-made water delivery systems are proving inadequate. This is particularly true in areas such as the western United States where persistent drought conditions only increase the difficulty of replenishing supplies of fresh water. This situation is not limited to Southern California, but is increasingly common in growing numbers of population centers around the world.

Recent data on the water usage of single-family residences suggest that nearly three-quarters of residential water is used for landscape and exterior purposes. Such data has caused local water districts to focus on reducing the amount of fresh water used for residential landscape purposes.

In typical residential landscape drainage systems, extra landscape water is captured in 3-inch drains spaced approximately 12 to 15 feet apart. Most of the water that is not captured by the drains passes through the permeable soil below, until it reaches an aquifer. The water captured by the drains is often sent through a drainage system that flows into a curbside gutter. That water then travels along the street gutter and combines with other residential overflows. The original landscape runoff water, possibly mixed with pesticides and fertilizer, combines, for example, with chlorine water overflows from neighborhood swimming pools and/or water overflows from car washing. As the flow of water continues, bacteria are introduced, such as from garbage cans that sit in the gutters. Too frequently, such water and associated material flows to storm drains and into ecologically sensitive areas, particularly wetlands and oceans.

Water districts have considered some ideas for reducing the dirty water runoff. One is a system that slows down the flow of runoff water and uses natural filters before the runoff proceeds to enter environmentally sensitive areas. One such experimental program diverts water from local creeks into reconstructed wetlands for a period of 7-10 days. Plants and soils can then naturally remove some fraction of the nitrates and other pollutants from the runoff water, whereupon the water returns to the creek and flows onward. The use of natural filters may result in somewhat cleaner runoff water entering bays, oceans, and other bodies of water or sensitive areas, but such systems are expensive to build and have environmental implications for the ecosystems in which they are "naturally" filtered.

Other existing systems involve complicated methods of treating sewer water, and require new systems of pipes to deliver such treated water to households. The complexity and associated cost of such systems has been prohibitive.

Systems for draining and directing water are not new, and the system disclosed in U.S. Pat. No. 5,192,426 issued to DeCoster et al. is typical of such systems, which generally operate by collecting water at a drain located at a low spot on a terrain surface area and routing or directing water via drain pipes, sometimes into holding tanks. Such systems, however, fail to address the significant loss and runoff of water that is used for irrigation and watering and do little, if anything to reduce the large demand for fresh water for such purposes.

Controllers that automate aspects of irrigations systems are also well known, and the irrigation controller in U.S. Pat. No. 6,298,285 issued to Addink, et al. is typical. However, such irrigation controllers have not heretofore used or disclosed the advantageous features of the systems and methods in accordance with the present invention.

SUMMARY

Embodiments of the present invention use natural gravity flow and subterranean capture and channeling to harvest landscape water. In some cases, the embodiments may advantageously reduce water bills and significantly reduce polluted storm drain runoff. Systems designed according to the presently disclosed embodiments may also advantageously store and recycle precious rain and irrigation water. Some systems in accordance with the present embodiments have drains that are less visible or invisible to casual observers and individuals using the land above them, for example, by being subterranean, and thus have an esthetically pleasing appearance. Some such systems may also reduce sunken or uneven surface areas for drains and encourage a more level surface. Certain embodiments can be used to reduce rodents, while others may encourage life beneficial to lawns or gardens, such as earthworms. Also, advantageously, some embodiments may be self-contained and may operate to provide advantages without requiring a municipal or service-provider infrastructure.

The inventions contemplated herein provide a number of advantageous objectives. One object of the present inventions is to reduce used landscape water that may enter ecologically sensitive areas. Another object of the present inventions is to capture water for re-use before run-off travel causes the water to gather impurities, chemicals and pollutants and before it enters saline bodies of water, such as a bay or ocean, and becomes undesirable for re-use due to chemical, pollutant or saline content which may damage lawns and surrounding flora. Another object of the present invention is to ease the substantial demand for fresh water. Another object of the present invention is to allow for remote management, including monitoring and controlling, of such irrigation systems.

One advantageous embodiment of the present invention is a fluid reclamation apparatus comprising: an intake drain located substantially under an area of land, a fluid tank, a fluid mover, and a fluid distribution apparatus, wherein the intake drain is configured to guide fluid toward the fluid tank, the fluid mover is configured to move a volume of fluid from the fluid tank and through the fluid distribution apparatus and the fluid distribution apparatus is configured to provide the volume of fluid to the area of land above the intake drain. An advantageous aspect of that embodiment is one wherein the fluid comprises water. Another advantageous aspect of that embodiment is one wherein the fluid mover comprises a pump. Another advantageous aspect of that embodiment is one wherein the intake drain receives a portion of the volume of fluid and guides the portion of the volume of fluid into the fluid tank. Another advantageous aspect of that embodiment is one wherein the intake drain is semi-permeable and a second portion of the volume of fluid moves into a volume of land under the intake drain. Another advantageous aspect of that embodiment is one wherein the intake drain comprises one or more inclined surfaces located substantially under the area of land. Another advantageous aspect of that embodiment is one wherein at least one of the inclined surfaces is formed of a layer of a first material and a layer of a second material different from the first material. Another advantageous aspect of that embodiment is one wherein the one or more inclined surfaces are located under the area of land and span a second area in a plane substantially parallel to the upper surface of the area of land, and the second area is no larger than the area of land. Another advantageous aspect of that embodiment is one wherein the intake drain further comprises one or more support structures that assist in bearing the weight of material above the intake drain. Another advantageous aspect of that embodiment is one wherein the intake drain comprises at least one intake pipe having a first end connected to the fluid tank, and wherein the at least one intake pipe is configured to provide fluid to the fluid tank. Another advantageous aspect of that embodiment is one wherein the intake drain comprises a fluid filter apparatus to restrict the entry of first matter into the fluid tank. Another advantageous aspect of that embodiment is one wherein the first matter comprises one or more of first particles. Another advantageous aspect of that embodiment is one wherein the first matter comprises one or more of first chemicals. Another advantageous aspect of that embodiment is one further comprising a fluid treatment apparatus to change the composition of the fluid. Another advantageous aspect of that embodiment is one further comprising a fluid treatment apparatus, wherein the fluid treatment apparatus causes the fluid to include one or more of second particles. Another advantageous aspect of that embodiment is one further comprising a fluid treatment apparatus, wherein the fluid treatment apparatus causes the fluid to include one or more of second chemicals. Another advantageous aspect of that embodiment is one wherein at least a portion of the change in the composition of the fluid is based on exposing at least some of the fluid to energy emitted as waves. Another advantageous aspect of that embodiment is one further comprising a fluid source apparatus that directs fluid from a source other than the intake drain into the fluid tank. Another advantageous aspect of that embodiment is one further comprising a processor-based management system including a user interface, wherein a selectable option provided by the user interface generates a first signal, and wherein, in response to the first signal, the processor-based management system activates the fluid mover. Another advantageous aspect of that embodiment is one wherein the user interface is generated by data transmitted to a web browser. Another advantageous aspect of that embodiment is one further comprising: a second intake drain located substantially under a second area of land, a second fluid tank, a second fluid mover, and a second fluid distribution apparatus, and wherein the second fluid mover is configured to move a second volume of fluid from the second fluid tank and through the second fluid distribution apparatus, and the second fluid distribution apparatus is configured to provide the second volume of fluid to the second area of land, and wherein a selectable option provided by the user interface generates a second signal, and wherein, in response to the second signal, the processor-based management system activates the second fluid mover.

Another advantageous embodiment of the present invention includes a method for reducing water usage, the method comprising: receiving a first volume of water at a water tank from a water drainage system that includes a funnel located under an area of land, receiving an electronic irrigation signal from a sprinkler management system, and in response to the irrigation signal, automatically generating a pump signal to activate pumping a second volume of water from the water tank to a water distribution apparatus to irrigate the area of land above the funnel. An advantageous aspect of that embodiment is one wherein the water drainage system includes a plurality of funnels, and the first volume of water is received based on water flow through at least two of the funnels. Another advantageous aspect of that embodiment is one wherein the water distribution apparatus includes a water flow path provided between at least two of the plurality of funnels. Another advantageous aspect of that embodiment is one further comprising applying an additive to at least one of the first or second volumes of water.

Another advantageous embodiment of the present invention includes a method for reducing water usage, the method comprising: receiving a first volume of water at a water tank from a water drainage system that includes a funnel located under an area of land, receiving an electronic water level signal from a first sensor, the electronic water level signal representative of a sensed volume of water in the water tank, and based at least in part on the sensed volume of water, automatically generating a fill signal to activate adding water to the water tank from a source other than the water drainage system.

Another advantageous embodiment of the present invention includes a method for reducing water usage, the method comprising: receiving a first volume of water at a water tank from a water drainage system that includes a funnel located under an area of land, receiving an electronic water level signal from a first sensor, the electronic water level signal representative of a sensed volume of water in the water tank, and based at least in part on the sensed volume of water, automatically generating a pump signal to activate pumping of water from the water tank to a water distribution apparatus to irrigate the area of land above the funnel. Another advantageous aspect of that embodiment is one further comprising: receiving an electronic flow signal from a second sensor, the electronic flow signal representative of a sensed level of water flow through a water flow path in the water drainage system, and, based at least in part on the sensed level of water flow, automatically generating a stop signal to deactivate the pumping of the water.

Another advantageous embodiment of the present invention includes a method for reducing water usage, the method comprising: receiving a first volume of water at a water tank from a water drainage system that includes a funnel located under an area of land, receiving an electronic moisture signal from a first sensor, the electronic moisture signal representative of a sensed level of moisture of the area of land, and, based at least in part on the sensed level of moisture, automatically generating a pump signal to activate pumping of water from the water tank to a water distribution apparatus to irrigate the area of land above the funnel. Another advantageous aspect of that embodiment is one further comprising: receiving an electronic flow signal from a second sensor, the electronic flow signal representative of a sensed level of water flow through a water flow path in the water drainage system, and, based at least in part on the sensed level of water flow represented by the electronic flow signal, automatically generating a stop signal to deactivate the pumping of the water.

Another advantageous embodiment of the present invention is a system for managing fluid usage, the system comprising: (1) a fluid reclamation apparatus comprising an intake drain located substantially under an area of land, a fluid tank, a fluid mover, a fluid distribution apparatus, and at least one sensor generating an electronic signal indicative of information pertinent to the operation of the fluid reclamation apparatus, wherein the intake drain is configured to guide fluid toward the fluid tank, the fluid mover is configured to move a volume of fluid from the fluid tank and through the fluid distribution apparatus, and the fluid distribution apparatus is configured to provide the volume of fluid to the area of land above the intake drain; and (2) a sprinkler management system configured to manage the fluid reclamation apparatus, the sprinkler management system implemented in computer hardware, and the sprinkler management system comprising a user interface configured to receive user preferences from a user, and a sensor and control engine configured to operate the fluid reclamation apparatus based on user preferences and sensor signals.

Another advantageous embodiment of the present invention is a method for managing irrigation systems, the method comprising: receiving first irrigation status data representative of at least one irrigation performance characteristic of a first irrigation system that comprises a first drain structure below a first area of land to guide water into a first tank and also comprises a first pump to transport water from the first tank to irrigate the first area of land, and using the first irrigation status data to generate first displayable status data on a display screen of a processor-based control device, the first displayable status data indicative of the at least one irrigation performance characteristic of the first irrigation system. An advantageous aspect of that embodiment is one wherein the first displayable status data comprise a graphical image illustrating a representation of one or more components of the first irrigation system and also illustrating an operating condition of at least one of the one or more components of the first irrigation system. Another advantageous aspect of that embodiment is one further comprising receiving second irrigation status data representative of at least one irrigation performance characteristic of a second irrigation system that comprises a second drain structure below a second area of land to guide water into a second tank and also comprises a second pump to transport water from the second tank to irrigate the second area of land, and using the second irrigation status data to generate second displayable status data on the display screen, the second displayable status data indicative of the at least one irrigation performance characteristic of the second irrigation system. Another advantageous aspect of that embodiment is one further comprising receiving from a first user at a user interface of the processor-based control device an irrigation modification request to modify irrigation system settings for the first irrigation system, determining based on user identification data for the first user that the first user is authorized to execute the irrigation modification request, presenting to the first user at the user interface a present value of each of a plurality of irrigation system settings, and accepting from the first user at the user interface a new value in place of the present value for at least one of the plurality of irrigation system settings. Another advantageous aspect of that embodiment is one further comprising: storing the first irrigation status data in an irrigation system database, storing the second irrigation status data in the irrigation system database, accessing the first and second irrigation status data from the irrigation system database, and based on the accessed first and second irrigation status data, automatically presenting on the display screen one or more recommended modifications to the irrigation system settings of the first irrigation system.

Another advantageous embodiment of the present invention is a water harvesting and distribution system that comprises an intake drain area, an intake pipe, a water reclamation tank, a water pump, and an outlet pipe having a first end connected to the water reclamation tank, and wherein the intake pipe connects the intake drain area and the water reclamation tank, and the water pump is configured to pump water out of the water reclamation tank through the outlet pipe. In another advantageous aspect of that embodiment, the intake drain area comprises a funnel with a body and a perimeter edge. In another advantageous aspect of that embodiment, a second end of the outlet pipe directs a volume of water to irrigate land above the intake drain area, and the unused portion of the volume of water drains into the intake drain area and flows through the intake pipe and into the water reclamation tank. In another advantageous aspect of that embodiment, the intake drain area is located substantially below ground. In another aspect of that embodiment, the system includes sensors and controls, which can communicate with a management system. Another advantageous aspect of that embodiment allows users to monitor and control one or more such water harvesting and distribution systems.

BRIEF DESCRIPTION OF THE DRAWINGS

FIG. 1B presents a table showing experimental observations for the prototype scale embodiment of FIG. 1A.

DETAILED DESCRIPTION

Multiple embodiments of the invented systems and methods are disclosed herein. More than one aspect of the inventions may be represented in combination by single embodiments. Combinations of embodiments may deliver advantages not inherent in the constituent embodiments.

To achieve the advantages and objectives of the present inventions, the inventor contemplated practical systems and methods for commercial and residential properties using existing and affordable technology and components, rather than complex systems requiring expensive alterations in water treatment and delivery infrastructure where cost and adoption factors would likely make such systems impractical and prone to failure. The inventor further contemplated systems and methods that could protect natural environments by reducing the flow of dirty or contaminated runoff into wetlands, into bodies of water, or into other areas ecologically sensitive to such runoff. The inventor thus contemplated systems and methods that can harvest and recycle excess landscape water, even at a residential level, and thereby advantageously reduce both the demand for fresh water and the levels of damaging runoff.

Nevertheless, embodiments of the present disclosure can be adopted on a large scale. For example, towns and water municipal districts can implement embodiments of the present disclosure to reduce excess water consumption on a macroscopic scale.

Prototype Scale Embodiments

Figure 1A:
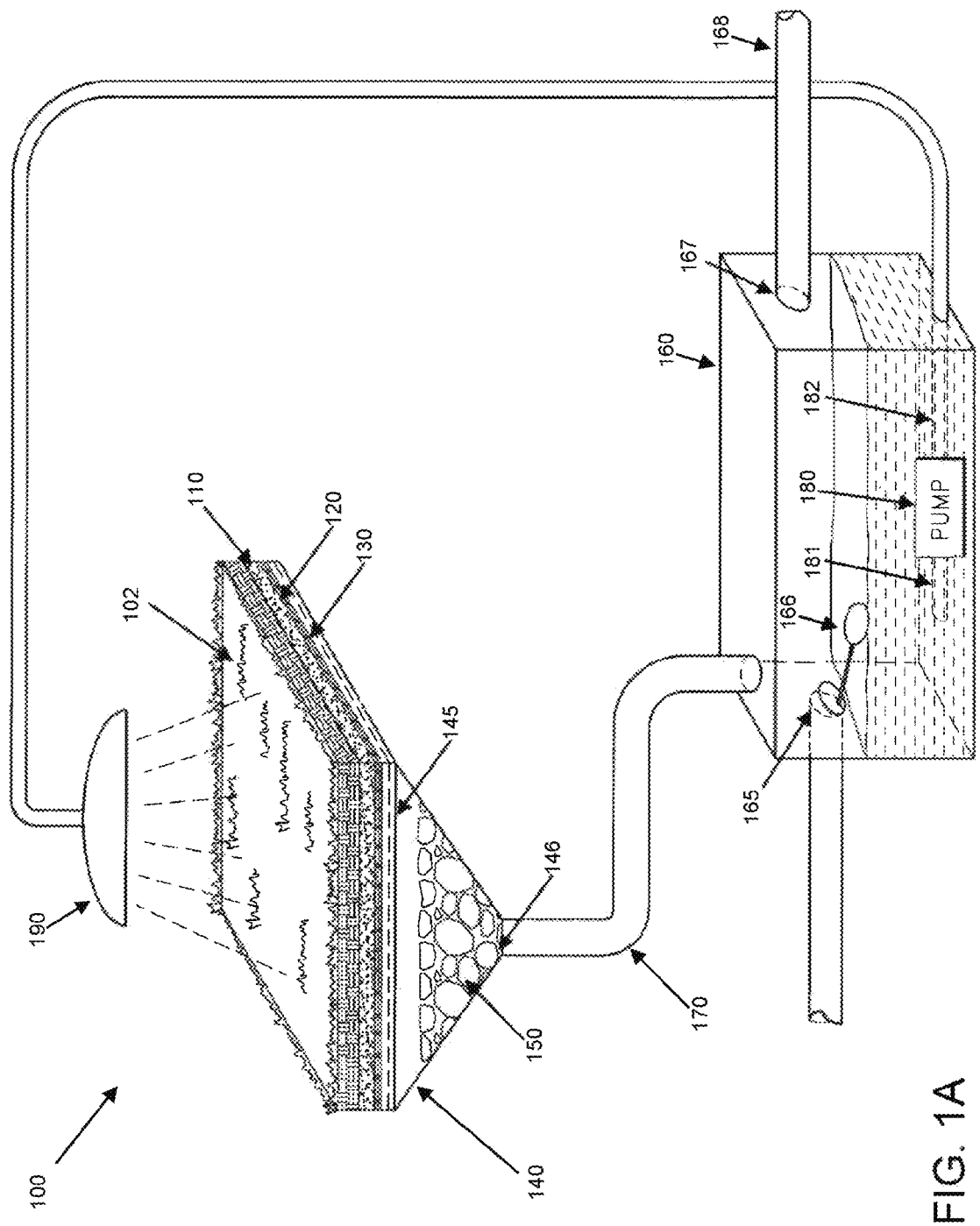
FIG. 1A illustrates a prototype scale embodiment of a water harvesting and reclamation system.

FIG. 1A illustrates a prototype scale embodiment of a water harvesting and reclamation system 100. Objectives and advantages of the present disclosure may be observed in systems and methods implementing the prototype scale embodiment depicted in FIG. 1A. Note that the water harvesting and reclamation system 100 was created as a proof of concept. One skilled in the art will recognize that a number of elements can be replaced with similar more durable elements designed for larger implementations.

The water harvesting and reclamation system 100 includes a 6-inch by 6-inch layer of sod 102, seated on a bed of sand 110 which is placed over a cheesecloth 120. Underlying the cheesecloth is a single layer of a water permeable membrane 130, for example, Commercial Weed Block® from Easy Gardener® (model #25090MJ). Some prototype scale embodiments include only the cheesecloth 120 or only the permeable membrane 130. Beneath the membrane 130 is the mouth 145 of a funnel 140 which is filled with gravel 150, for example, filled to a level that substantially prevents the sod from sagging downward, and the gravel 150, for example, of sufficient granularity to allow water to flow freely there through without slowing or stopping due to clogging. In one embodiment, the funnel may take the shape of an inverted pyramid, but it will be appreciated that many other funnel-type shapes may be used.

The prototype scale embodiment further includes a water reclamation tank 160 having a capacity of approximately three to five gallons. By way of example only, and not limited by any particular form of tank, in one prototype scale embodiment, the water reclamation tank 160 may be a five-gallon aquarium. In other embodiments, the tank may be of similar capacity, but may take any of a wide variety of shapes, including cylinder, hemisphere, cube or three-dimensional rectangle, or otherwise. In the prototype scale embodiment, the base of the funnel 140 is higher than the top of the tank 160, and a water-conducting channel 170, such as may be constructed from standard PVC pipe, connects the base of the funnel 140 to the top of the tank 160 such that water entering the mouth 145 of the funnel 140 will be conducted from the base of the funnel 140, through the channel 170, and into the tank 160, without significant loss of water between the funnel 140 and the tank 160.

The prototype scale embodiment also includes a pump 180 suitable for pumping water. The pump may be located in or near the tank 160. As is common, the pump 180 has an input line 181 and an output line 182, both of which may, in one embodiment, be comprised of plastic tubing. During operation of the pump 180, water may be drawn into the pump 180 through the input line 181 and forced out of the pump 180 through the output line 182. The pump 180 may be an electric pump, using alternating or direct current, and it may be powered by standard electrical outlet, battery, solar or other sources. The pump may alternatively be driven by an internal combustion-type or other motor. The present inventions are not limited by any type of pump.

In the prototype scale embodiment, the input end of the pump input line 181 is preferably located at the bottom of the tank 160 so that when the pump 180 is operated, nearly all of the water may be drained from the tank 160. The output end of the pump output line 182 is connected to a watering device 190, such as, for example, a sprinkler or showerhead apparatus, which is positioned to water the sod 102 with the expected water flow. In one embodiment, the sprinkler 190 does not water areas beyond those areas of the sod 102 expected to drain into the funnel 140.

The prototype scale embodiment still further includes a float-activated valve 165, such as, for example, a filler float assembly that may be found in a typical household toilet. As is well known, the filler valve 165 is open (as shown) when the float 166 is below a certain level, and is closed (not shown) when the float 166 has risen past that level. The float-activated valve 165 is located in the tank 160 such that it will close and prevent water flow when the tank 160 is filled with water at or above a certain threshold, but will allow water flow when the tank 160 water level is below that threshold.

The prototype scale embodiment also comprises an overflow outlet 167 near the top of the tank 160. In one embodiment, the overflow outlet 167 allows water to flow through the outlet 167 when the water level in the tank 160 rises upward to the point at which the overflow outlet 167 is located. In one embodiment, the outlet 167 is connected to plastic tubing 168, which leads to a safety catchment container (not shown) independent of the rest of the apparatus.

In various embodiments, overflow leaving the outlet 167 may drain into the soil or other material surrounding the tank 160, it may lead into a municipal or other drainage system, or it may (as is discussed below) feed into other tanks associated with additional water harvesting and reclamation systems. For example, excess water in a front yard of a house can be piped to a system installed for the back yard of the house. The present inventions are not limited by the destination of any overflow.

Operation of the prototype scale embodiment may be initiated by watering the sod 102. Alternatively, operation may be initiated by connecting a water supply to the filler valve 165. Using this approach, the filler float 166 in the initially empty tank 160 is low enough that the filler valve 165 opens and the tank 160 fills until a predetermined amount of water, 8 quarts in the example prototype embodiment, has entered the tank 160. The prototype scale embodiment may be configured so that the valve 165 may close when the float 166 rises to the level associated with 8 quarts of water in the tank 160. The water supply may optionally then be removed or turned off. Another way of initiating operation is to wait until the tank 160 is naturally sufficiently full of water. This initiation technique may, in practice-scale embodiments, correspond to waiting for a natural accumulation of rainfall or runoff passing through the soil over the catchment area (which drains into the funnel 140) to reach a predetermined level.

It may be observed in the prototype scale embodiment, that as the water seeps through the soil or sand 110, relatively small amounts of the water are absorbed by the sod 102's roots through osmosis. Additional and similarly negligible amounts may be lost to evaporation, consumed by other organisms, or remain absorbed in now-moist soil or sand 110. However, significant portions of the water filter downward through the soil or sand 110 to pass the cheesecloth 120 and permeable layer 130, leaving behind most of the larger pieces of sediment The water then passes through the mouth 145 of the funnel 140, flowing around and between the pieces of gravel 150, which in the prototype scale embodiment are there primarily to support the materials above them and not for any particular filtration or value-adding functionality, although other implementations may use specialized gravel or coal, or other specialized materials for such purposes. The water then flows to the base of the funnel 140 (past any drain grate 146) and enters the PVC piping 170, whereupon the water is channeled via gravity into the tank 160.

As the water fills the tank 160, it lifts the float 166 of the float valve 165 as described above. The rising float 166 may cause any active water intake system to shut off or can cause the intake valve 165 to close if it is open.

By operation of the pump 180, the water in the tank 160 may then be pumped through input lines 181, into the pump 180, and forced through the output lines 182 to the sprinkler system 190. As will be discussed below, other embodiments may use other pumping mechanisms and methodologies, but the prototype scale embodiment may contain a battery-powered pump manually controlled by an external operator. When turned on, the pump 180 takes merely a few minutes to drain the water from the tank 160, and to thereby water the sod 102. Over the next 24 hour period, the water again drains through the prototype scale embodiment, accumulating in the tank 160.

It will be understood that the above-noted dimensions are merely illustrative or descriptive of an illustrative embodiment. The dimensions can depend upon one another, upon the materials used, upon the properties of the land or material being drained, upon the anticipated or observed levels of water or other liquid expected to pass through the system, upon the excess capacity designed into the system, and other factors. It is understood that one of ordinary skill in the art can readily vary the dimensions of the various components to adapt an embodiment for a particular application through routine experimentation in view of the disclosure herein.

Observed Advantages

FIG. 1B presents a table 198 showing experimental observations for the prototype scale embodiment of FIG. 1A. In observing the advantages of the present invention via such a prototype scale embodiment, the entire apparatus may be kept closed to prevent contaminants from entering the system and to prevent evaporation of water. This may be accomplished by enclosing the system in plastic (or other substantially waterproof) materials, and by covering any openings.

Over a seven day period, the described prototype scale embodiment of the water harvesting and reclamation system 100 was operated according to the methodology described above. Eight quarts of water were initially placed in the tank 160. The pump 180 was operated until the tank 160 was empty, causing the sod 102 to be watered. Twenty-four hours later, the measured volume of water in the tank 160 was found to be 99.9% percent of the initial volume of water. The process was repeated each day, and after one week of simulated watering (seven pump operations), nearly 99.3% of the original eight quarts was measured in the tank 160. The turf in the sod 102 appeared healthy throughout and subsequent to the week-long period, and was observed to grow daily without addition of any fertilizer or other enhancements.

These results demonstrated feasibility to use the disclosed systems and methods to harvest and recycle excess residential and commercial landscape water. A prototype of such a device recycled 99.9% of the water used to irrigate a 36 square inch area of sod for five minutes a day, every day for a week. Assuming that 99.9% is a consistent weekly efficiency rating, over the course of a 52-week year, 94.9% of the original water would remain in the system: more than 7.5 of the original 8 quarts. If the 8 quarts were released each day and not captured, then in a 364 day year 2904 quarts could be saved (assuming the system can operate on 7.5 quarts). This calculated 726 gallon annual savings is based, again, on the experimental results of using a prototype scale embodiment in conjunction with the irrigation of 36 square inches of sod. The conservation of water offered by the present invention is enormous, even after the effects of evaporation, leakage and other practical realities of operating embodiments of the present invention.

Production Scale Embodiments

Embodiments designed to operate at production scale may operate in a typical residential or commercial landscaping environment, wherein, for example, a lawn may be given approximately 1 inch of water a week. At roughly 0.0043 gallons per cubic inch, and per that recommendation, each square foot may be watered with 0.62 gallons per week, and, similarly, a 10-foot by 10-foot plot of land may be watered with approximately 62 gallons a week. In practice, some lawns will be watered with more water and some with less. Moreover, the amount of water or other liquid that may be captured by a particular embodiment of the present invention may depend on a variety of factors. These factors can include the installation of the embodiment, the climate and weather, the plants or other materials in the land, the soil or substrate being watered, and the nature of the area being watered (for example, the area being watered may be a planter with a fixed depth or a yard that extends down into the earth). These and other factors may affect the amounts of irrigation water that may be saved by various production scale embodiments of the present invention. Regardless, use of the present inventions may be expected to result in substantial capture and re-use of fresh water, which may, in turn, dramatically reduce the demand for fresh water, and provide for the numerous advantages disclosed herein.

Water Harvesting and Reclamation System

Figure 2:
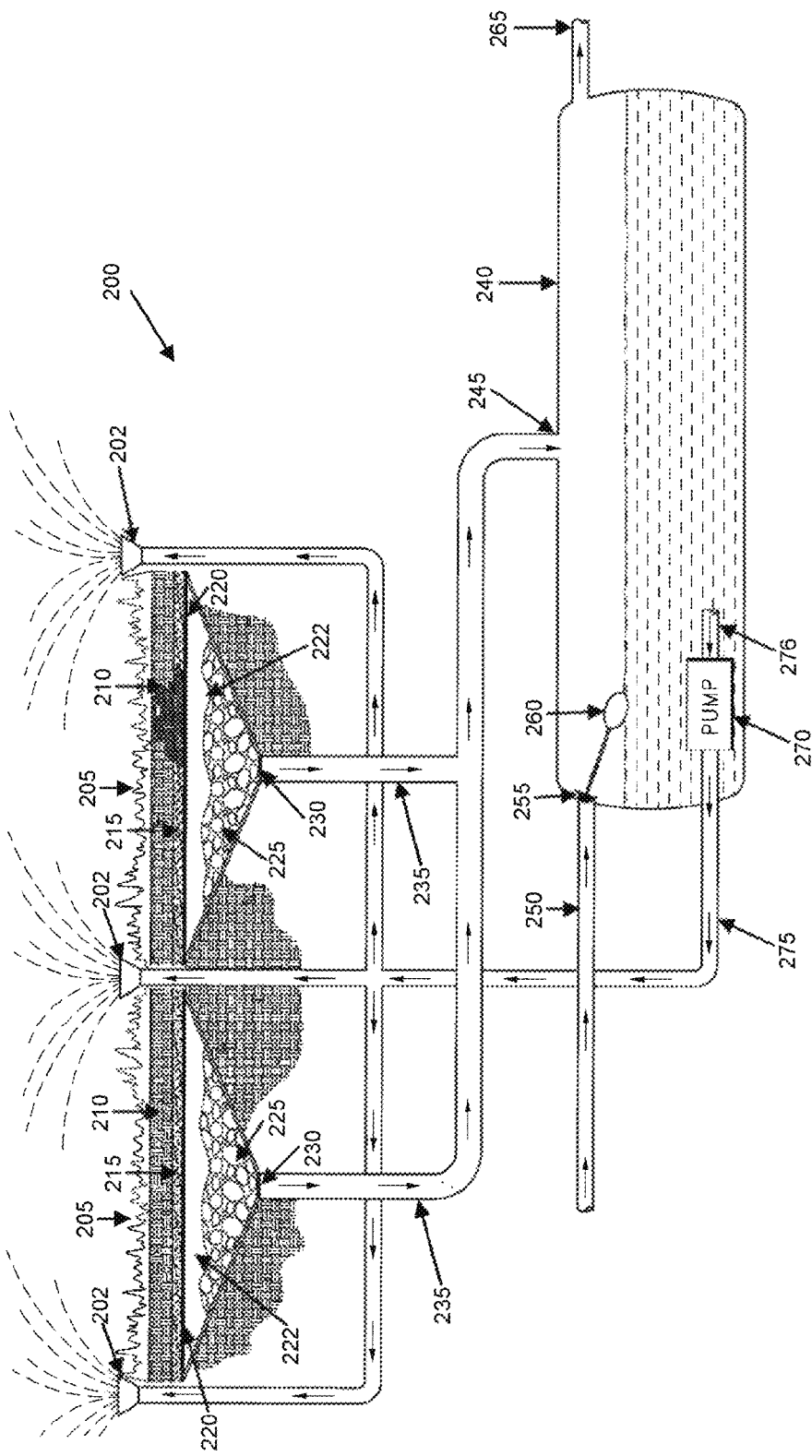
FIG. 2 illustrates an exemplary production scale embodiment of a water harvesting and reclamation system.

The present inventions, and their numerous embodiments, are described herein as applying to the use of water, for example, in irrigation contexts. However, one of ordinary skill will appreciate that water is merely one of virtually limitless types of fluids that may be used, and the present inventions are not limited to the use of water. FIG. 2 illustrates a production scale embodiment of a water harvesting and reclamation system 200. Water is distributed from sprinklers 202 to water sod 205. The water permeates the layers of soil 210 beneath the sod 205, with some of it eventually reaching a permeable layer 215. The water passes through the permeable layer 215, entering the mouth 220 of a funnel 222, which is optionally filled with an amount of gravel 225. The water flows past any gravel 225, past a drain gate 230, and into a drain pipe 235. The drain pipe 235 leads to a water reclamation tank 240.

The water enters the water reclamation tank 240 through one or more intakes 245 fed by the drain pipes 235. In one embodiment, the water reclamation tank 240 is connected to a fresh water pipe 250, which may be connected to a municipal water supply. In the illustrated embodiment, the connection between the fresh water pipe 250 and the water reclamation tank 240 is regulated by a flap valve 255 connected to a floater ball 260, as discussed above in the context of the prototype scale embodiment, though other volume-sensitive control structures may be used.

In one embodiment, the water reclamation tank 240 has at least one overflow pipe 265, which leads excess water away from the water reclamation tank 240. In one embodiment, the overflow pipe 265 may lead to another water reclamation tank associated with another water harvesting and reclamation system, for example, the neighboring yard or the back yard. In one embodiment, the overflow pipe 265 may lead to a drain or a sewer as is common in some existing systems. In another embodiment, the overflow pipe 265 may lead to a municipal water storage tank or to a municipal water sanitation station. The ultimate destination of the overflow pipe 265 does not limit the scope of these inventions and any number of other destinations for the overflow water from overflow pipe 265 is possible.

Also associated with the water reclamation tank 240 is a pump 270. In one embodiment, the pump 270 has an input 276 located at the bottom of the water reclamation tank 240. In one embodiment, the input 276 is located at the base of a slope in the water reclamation tank 240 or in another location designed by those of skill in the art to ensure access to a maximal amount of the water in the water reclamation tank 240. The pump 270 pumps water from the input into a recycled irrigation pipe 275, which directs the water to sprinklers 202. In turn, sprinkler 202 distributes the water to the sod 205, beginning the cycle again.

Sod and Sprinklers

In one embodiment, the sod 205 can include any matter that requires watering. For example, sod 205 can include trees, flowers, food plants, and grass lawns. In one embodiment, the sod 205 can include non-plant matter and even inorganic material that is watered, perhaps to reduce flammability. Similarly, embodiments are not limited to water being the fluid used for "watering". In addition to the additive variations discussed below, some embodiments can use any liquid that a user desires to disperse over a pre-defined area and which penetrates the substrate for processing by the embodiment. For example, the methods and systems disclosed herein can be applied to recycle fire-fighting liquids that are dispersed in an area. Likewise, embodiments of the present invention may be deployed in virtually any type of land such as, for example, soil 210, sand, ground, bog, clay or any substrate through which the liquid flows.

Accordingly, the sprinklers 202 may be implemented by any number of fluid distribution mechanisms suitable for distribution of the liquid over the material being "watered." The present invention is not limited by any particular type of fluid distribution apparatus, which could be, for example, one or more hoses in one embodiment, a flattened hose with drip holes along its length in another embodiment, or a stationary or mobile sprinkler or a pop-up sprinkler in other embodiments. Typically, sprinklers 202 are configured to water the area above the funnels 222 so that the water can be recaptured by the water reclamation tank 240 creating a cyclical process. However, in one embodiment, sprinklers 202 can be used to provide water to other sod or pieces of land.

A person of ordinary skill will be able to use materials known to be suitable for a particular application. For example, pipes and reclamation tanks can be created out of materials tolerant of the liquids to be dispersed and the permeable membrane can be created to be substantially permeable by the liquid to be dispersed and substantially non-permeable by the actual substrate to create a system according to this disclosure. For the remainder of this disclosure embodiments will generally be discussed in the context of water, lawns, and sprinklers for ease of illustration and without limiting these inventions to such embodiments.

Subterranean Installation and the Intake Drain Area

In one embodiment, a subterranean system captures excess rain and irrigation water that would otherwise be lost underground or to runoff. Various embodiments are possible for the installation of the water harvesting and reclamation system. For example, FIG. 2 illustrates one embodiment in which the funnel 222 of an intake drain is installed both directly below and fairly close to the sod 205. As described below, both the depth and placement of funnel 222 may vary.

In one embodiment, the gravel 225, which fills the funnel 222, serves to support the layers above the funnel, avoiding any depressions or dips in the surface of the lawn. Alternative means of achieving this are possible. Furthermore, gravel 225 can include any type of substance that can provide support to sod 205 while enabling water to drain through to drain pipe 235. For example, gravel 225 may include gravel and soil. As a second example, gravel 225 could include sand, or some synthetic material optimized for plant growth.

Figure 3:
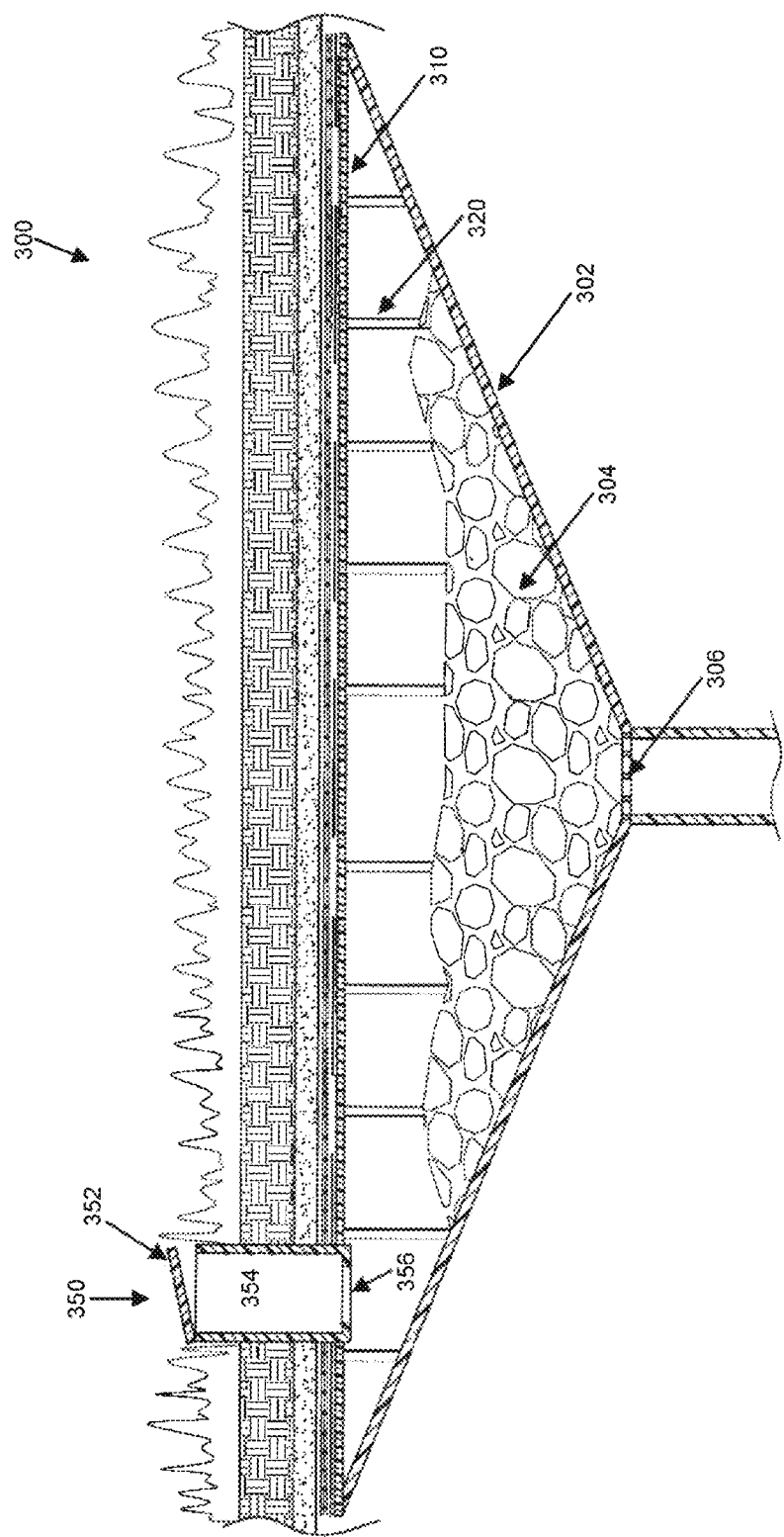
FIG. 3 illustrates an example embodiment of funnel installation associated with a water harvesting and reclamation system.

FIG. 3 illustrates another example embodiment of a funnel installation and support system 300 associated with a water harvesting and reclamation system. FIG. 3 also illustrates one embodiment of an additive installation system 350, which is described in further detail below.

In one embodiment, funnel 302 of an intake drain includes a lattice of support beams, which includes vertical beams 320 and one or more horizontal beams, such as horizontal beam 310 located at the mouth of funnel 302. In one embodiment, the horizontal beam 310 remains permeable to water, or any other liquid used by the water harvesting and reclamation system. Alternatively, horizontal beam 310 is not permeable, but includes multiple horizontal beams spaced such that water can flow between the horizontal beams. Means of constructing such supports are generally known in the art, and embodiments such as those depicted in FIG. 3 use such means. In some embodiments, funnel 302 may still contain gravel 304 or some other fill as a supplement, to keep the lawn above the mouth of the funnel 302 and to support the weight of people and objects on that portion of the lawn. In some embodiments using vertical beams, the vertical beams may extend upward from the funnel surface to engage and support a horizontal beam or other approximately planar structure that may, for example, assist in bearing weight. The vertical beams may be any of a variety of shapes, including struts, columns or pillars. One or more of the vertical beams may also advantageously contain a water flow channel (e.g., an embedded irrigation pipe 275) that spans the length of the beam and provides at least a portion of an irrigation path connection between a water reclamation tank 240 and a sprinkler 202, and it will be appreciated that such vertical beams may be positioned at locations along the surface of the funnel where appropriate perforations are formed to allow connection between an irrigation pipe 275 and the water flow channel in the vertical beam.

In an alternative embodiment, funnel 302 may include perforated or water permeable walls. In general, the grass or plant life above the mouth of the funnel may be supported using any means known in the art. Rather than keeping the lawn even, some embodiments may use various supports as part of an effort to create unevenness, such as steps. As one example, such embodiments may use two or more sets of vertical support beams, one set sized to support a first ground level, and the second set sized to support a second ground level that is either higher or lower than the first ground level. Unevenness could be for any number of reasons including aesthetic purposes, to allow for the installation of plants that have varying soil level requirements, to make the lawn suitable for a particular use, or to modify the flow of water in the area above the mouth of the funnel 302.

In addition to providing support, in some embodiments the gravel may function as a filter. Treated gravel or charcoal may also be used to enhance the filtering and purifying effects.

In one embodiment, the funnel 302 resembles an inverted equilateral square pyramid with a drain hole 306 (and drain grate) at the vertex. Many other configurations are possible, and neither size nor shape limits the design, although it is preferable to have a design such as that disclosed, which encourages water towards the drain hole 306. For example, the funnel 302 could have a conical shape. Some embodiments, for example those with larger bases (funnel mouths) designed to serve larger catchment areas of lawn above them, may have multiple drain holes. These multiple drain holes may ultimately lead to one or more than one water reclamation tank. Indeed, even embodiments with a single drain hole may include multiple drain pipes leading out of the hole to one or more water reclamation tanks, or a single drain pipe, which may feed more than one water reclamation tank.

In one embodiment, the funnel 302 need not have a particular slope. Alternatively, the funnel is designed with a pre-determined slope and/or one or more inclined surfaces, which may or may not be flat. For example, in an embodiment where the funnel 302 is packed with soil, thereby enabling plant roots to grow into the funnel, the funnel 302 may have a gradual slope to provide plant roots with longer access to the water. Alternatively, a sharper slope may be selected to prevent excessive water buildup in the funnel 302. Regardless of the slope, generally the slope of the funnel should be selected to ensure that water is directed towards a drain hole 306 that feeds a water reclamation tank.

In some embodiments, the funnel 302 may include a series of vertically-spaced, substantially horizontal panels, each panel shaped and/or sloped to rely upon gravity to guide the water that gathers on its upward facing surface downward and substantially in the direction of either a lower panel or into the mouth of a drainpipe. It will be appreciated that such panels may advantageously use curvature and/or channels formed into the panel surface to assist in directing the flow of water.

The preferred depth of the funnel will vary according to the surface material and the geology of the substrate. For example, different plants have different ideal root depths, and it is preferable that the permeable layer and thus the funnel be lower than such depths. Grasses may typically have a 3 or 4-inch root depth, but tomatoes may have a 3-foot root depth. Trees and shrubs may have much longer root depths. One or more funnels may advantageously be arranged around and to avoid interfering with such longer roots, and semi-permeable funnel materials may advantageously allow water to pass into the substrate to reach any roots that extend below the funnel itself. Further, a multi-funnel water harvesting and reclamation system, such as water harvesting and reclamation system 200, may include funnels at varying depths in different portions of the yard.

In some embodiments, the funnels associated with the water harvesting and reclamation system are located well-below the surface to enable a wide-variety of plants and life to thrive. Further, the depth and location of the funnels and/or water harvesting and reclamation system may be selected to ensure that the water harvesting and reclamation system does not interfere with other subterranean systems, such as gas lines.

In some embodiments, the mouth of the funnel 302 is large so as to provide a large intake drain area serving a large catchment. Both the size of the catchment area and the subterranean location of the mouth of the funnel 302 contribute to the ability of various embodiments to capture water that is not otherwise available to systems that rely on surface level drains and pipes to capture runoff. Some embodiments may, without limitation, include facilities explicitly designed to capture such runoff or to integrate with such systems by, for example, having surface level drainage pipes feed into the funnel, connecting them into the drain pipe, or connecting them into the water reclamation tank. When placed under the turf or lawn, some embodiments capture significantly more water than a few 3-inch drains spaced many feet apart, as currently used in some municipalities such as Huntington Beach, Calif.

In some embodiments, the subterranean intake drain area discourages the presence of rodents and other pests that may thrive in the conditions fostered by excessive runoff and the underground results of overwatering. One skilled in the art will understand that embodiments can be designed with materials and structures that deter the incursion of rodents into the water harvesting and reclamation system.

In some embodiments, the water harvesting and reclamation system is designed to leave enough water in the soil to enable desirable life, such as earthworms or spiders to survive in the soil. Accordingly, the water harvesting and reclamation system, in some embodiments, permits appropriate amounts of water to bypass the funnel and travel into the soil below it. Such amounts of water may be controlled in some embodiments by appropriately sizing perforations in the funnel.

In one embodiment, the mouth of the funnel 302 extends beyond the borders of any actively irrigated area. This enables the capture of water from beyond the area directly below where it first touches ground after, for example, being thrust upward by a sprinkler. Further, to maximize the capture of water, the catchment area may be larger than the watered area. For similar reasons, some embodiments may have non-permeable walls that extend up or up and out from the edges of the funnel mouth. These walls, which need not extend completely to the surface, may prevent water from moving laterally through the soil and thereby leaving the catchment area of the funnel.

In one embodiment, the funnel 302 is comprised of a substantially non-porous and/or substantially non-degradable material, including, in some embodiments, material that is approved for human consumable food and water industry uses, such as food grade plastic. However, many suitable materials can be used with the water harvesting and reclamation system to achieve desired results. For example, some embodiments can use alternative materials, such as concrete, vinyl or nylon sheeting, polymer-based substances, stainless steel, combinations and/or layers of such materials, such as porcelain or epoxy-coated materials, or other types of semi-porous or non-porous materials to capture and guide drainage flow. Other embodiments may implement a funnel by digging out an appropriate shape from the substrate and treating the exposed surface to make it substantially impermeable. Some embodiments may comprise one or more funnels formed from semi-porous materials. Other embodiments may comprise funnels that include one or more perforations and/or perforated surfaces that allow some portion of the water that may otherwise be captured by the system to seep into the surrounding substrate. As mentioned, such embodiments may be appropriate to ensure that the surrounding substrate is not completely deprived of moisture and/or to ensure that the surrounding substrate receives certain levels of moisture. This may be desirable to ensure that creatures and life forms can exist and thrive.

The permeable layer extending across the mouth of the funnel advantageously functions to keep the top layer of sand and soil, as well as other contaminants, out of the system, while allowing water to enter. As disclosed above, a particular water permeable material was used in the prototype scale embodiment, but many such materials are known and may be used with various embodiments. Further, some embodiments may lack the permeable layer altogether.

Another level of permeation and/or filtration may be provided by an optional drain grate covering the drain hole 306 at the vertex of the funnel 302. The drain grate serves to prevent the entry into the drain pipes of any gravel or other material that may be deliberately or accidentally located within the mouth of the funnel and beneath the permeable layer. The drain grate may comprise holes or slots or perforations having other shapes that are sized advantageously to restrict entry of materials of particular sizes. Further, the drain grate can be designed to prevent the entry of animals into the drain pipes. To this end, the drain grate may be composed of different material or of the same material as the permeable layer. Examples of suitable materials, in addition to those previously mentioned, include chicken wire mesh and burlap, and other, more weather resistant porous or mesh structures, such as polymer-based structures, to name a few. In some embodiments, the optional permeable layer is comprised of such materials as well.

The Drain Pipe

In some embodiments, captured water flows, by operation of gravity, from one or more drain pipes 235 of the intake drain and into a water reclamation tank 240. In one embodiment, the funnel 222 and water reclamation tank 240 are positioned so that the drain pipe 235 can generally slope downward from the base of the funnel to the water reclamation tank 240. Alternatively, the water reclamation tank 240 may be located in the same plane or above the drain pipe 235, such as with an above-ground installed water reclamation tank. In such embodiments, pumps or other mechanisms known to those skilled in the art may be used to direct the water from the drain pipes 235 to the water reclamation tank 240.

In one embodiment, the drain pipe 235 is composed of PVC or other similar material. However, a number of the described embodiments are not limited by the choice of drain pipe material. In some embodiments, the drain pipe 235 may integrate or merge with other pipe networks in order to carry water from those systems into the water reclamation tank 240 or to direct water from the funnel 222 into those systems. More than one drain pipe 235 may lead out of a funnel 222, and more than one funnel 222 may feed into a drain pipe 235. Similarly, a drain pipe 235 may feed more than one water reclamation tank 240, and a water reclamation tank 240 may be fed by more than one drain pipe 235.

In one embodiment, water harvesting and reclamation systems with multiple drain pipes or multiple water reclamation tanks may have flow control mechanisms that open or shut valves depending on the flow of water in the pipes and level of water in the water reclamation tanks. This is generally true of any embodiment that includes multiple paths for the water to follow: some embodiments may apply any of a number of known mechanisms to direct the water down a particular path or away from a particular path depending on the circumstances.

The Water Reclamation Tank, Overflow Pipes, and Fresh Water Pipes

In accordance with embodiments of the present invention, a fluid tank, such as the water reclamation tank 240, may be any tank suitable for holding a liquid. In one embodiment, it is sized to have a volume greater than a cumulative weekly intake of water (or other liquid, depending upon application), so that it can accommodate periods when rain or other circumstances cause it to accumulate more water than may be typical and to distribute less water than may be typical. In other embodiments, the water reclamation tank 240 may be sized to have a volume greater than the amount of water appropriate to irrigate the associated area of lawn (or other plants) above the recapture funnel(s) for one week without any rainfall and without considering the benefit of any re-use of water gained from recapture. It will be appreciated by one of ordinary skill in the art, that a water reclamation tank 240 of such size will advantageously facilitate appropriate irrigation for many, many weeks without any rainfall and without any introduction of new water, because any decrease in the volume of water will be due principally only to absorption by plants and to evaporation. In some embodiments, the water reclamation tank 240 is made of material resistant to corrosion or oxidation such as, for example, stainless steel or a polymer material. Such tank constructions are known in the art, and the present disclosure is not limited by any construction material for a water reclamation tank 240.

In one embodiment, the water reclamation tank 240 has one or more overflow pipes 265, or outlets. In one embodiment, the overflow pipe 265 is an outlet to the surrounding soil or land. In one embodiment, the one or more overflow pipes 265 are located near the top of the water reclamation tank 240, so that the water reclamation tank does not become completely full. The scope of this disclosure is not limited by the destination of water exiting the water reclamation tank through an overflow outlet or pipe, which may feed into a sewer system or into another water reclamation tank, for example. Alternatively, an overflow outlet or overflow pipe may have a valve which may be opened when the water reaches a certain level and closed when it is below a certain level. In such embodiments, the overflow outlet need not be high on the water reclamation tank. This may be implemented by a float-based valve (or floater ball valve), which operates to open a pathway through a pipe or outlet when rising water in a container reaches a threshold level, or by other known means for monitoring water levels and responsively controlling valves. Generally, such a valve is one-way. In other embodiments, the valve opens or closes based upon a supplied electrical signal. Electric water flow valves are well known in the art, and generally operate by remaining closed in the absence of supplied electricity, and opening upon the supply of a current or application of a voltage. In some embodiments, insulated wire connects the electric water flow valve to a control component configured to provide a current or apply a voltage to the valve when conditions indicate that the valve should be opened, such as, for example, upon receiving a signal from a water level or pressure sensor indicating that the water reclamation tank 240 is becoming full. In some embodiments, a filter is placed between the water reclamation tank 240 and the valve to ensure that water exiting the water reclamation tank 240 through the valve is free of debris that could gather in the valve and impede proper operation.

In one embodiment, a water reclamation tank 240 may also be connected to one or more fresh water pipes 250. Such a configuration is particularly appropriate if sprinklers 202 fed by the system do not have their own independent fresh water connection. Like the overflow pipe 265, the fresh water pipe 250 preferably has a valve controlling the connection with the water reclamation tank 240 and the valve may be controlled automatically in accordance with the water level in the water reclamation tank 240, such as through the use of a float-based valve. This enables the fresh water supply valve to be opened if the water level drops below a threshold and to be closed if the water level exceeds a threshold. In some embodiments, any overflow or fresh water valves can be manually controlled, allowing for at-will draining or filling of the water reclamation tank 240. In other embodiments, an electronic valve controls filling of the water reclamation tank 240 via a fresh water supply. As described above, the valve may be wired to and controlled by a control component that provides a current or applies a voltage to activate and open the valve. This enables fresh water to be supplied to the water reclamation tank 240 when, for example, a signal from a water level or pressure sensor indicates that the water reclamation tank has insufficient water to satisfy a demand for irrigation. In some embodiments, via sensors, the level of water in the water reclamation tank is relayed to a user, allowing the user to monitor and manually set the water level in embodiments that provide manual control of the one or more valves.

Water level sensors are well known in the art and the present disclosure is not limited by any particular water level sensor for monitoring a level of water in a water reclamation tank 240. Such water level sensors include float and tape level gauges that use a large diameter float and constant force spring, hydrostatic pressure transmitters that use the weight of liquid to calculate a level, cable float switches, magnetic float switches, and/or capacitance level switches. It is further well known how to integrate such sensors in water level control applications that include a pump and/or valve-controlled filling and draining lines to ensure that a tank remains filled at a predetermined and/or desired level of water or filled to a level that is between a minimum desired level and a maximum desired level.

The Pump, Recycled Irrigation Pipes, and the Sprinklers

In one embodiment, one or more fluid movers such as, for example, pumps 270 may be associated with the water reclamation tank 240 for moving the water from the water reclamation tank 240 back through recycled irrigation pipes 275 to the sprinklers 202 or other fluid distribution apparatus. In some embodiments, various types of pumps 270 and other mechanisms can be used to provide water from the water reclamation tank 240 to the sprinklers 202. For example, some embodiments may use gravity, suction devices, or pressure-based mechanisms and/or pumps, to name a few.

A wide variety of pumps 270 are commercially available and appropriate for use in embodiments in accordance with this disclosure. In one embodiment, submersible pumps may be located inside the water reclamation tank 240, as illustrated in FIG. 2. In other embodiments, pumps may be connected to, at, near or remotely from the water reclamation tank 240, but otherwise external to it and located above or below ground. In another embodiment, a pump may be located in an upper area of the water reclamation tank above the general water level. Pumps may be rated to pump water with varying amounts and types of contaminants or solid materials, and some are explicitly approved for use with more caustic liquids or with chemicals.

As is known in the art, pumps may be powered in a variety of ways, including by connection to electricity sources (power grid, home or industrial circuits, battery, solar, etc.), or by gasoline or similar fuel supply. In one embodiment, pump 270 can include one or more solar powered pumps, which may be installed above ground or in a subterranean location. For some applications, the cost of solar power equipment may be prohibitive, and it will be appreciated that some embodiments use a pump powered by alternative energy sources, such as electricity from a power plant, or a home generator. In one embodiment, for example, for a typical residential system, pump 270 has a minimum capacity of 90 feet of head, such as a Sta-Rite CC series pump powered by approximately 230 volts AC, which may achieve water throughput of over 200 gallons per minute. It will be appreciated that other embodiments may use pumps of lesser or greater capacity.

Embodiments may allow the one or more pumps to be activated in a variety of ways. For example, in some embodiments the pump 270 may be activated manually, much as a user might manually activate a lawn sprinkler system. As a second example, the pump may be activated via a timer, again similar to many of today's irrigation systems. Alternatively, or additionally, the pump 270 may be activated by signals generated by a control component, such as sprinkler management system 520, which is discussed in more detail below.

In one embodiment, sprinkler management system 520 can determine whether to activate pump 270 based on signals received from sensors associated with water harvesting and reclamation system 200, which detect, for example, the moisture levels in the sod or humidity in the air. As a second example, sprinkler management system 520 may generate signals to activate the pump 270 in response to sensor readings indicating the flow of water in the drain pipe. In this example, sprinkler management system 520 may activate the pump 270 when the level of flow (or change in the level of flow, or time passing since detection of a certain level of flow) in the drain pipe 235 indicates that irrigation may be needed. These sensors are discussed in more detail below In one embodiment that uses an electric pump, AC voltage is provided to the pump via a wire of appropriate gauge connecting a lead on the pump to a relay, and the relay is in turn wired to an appropriate breaker circuit with ground fault circuit interrupt protection to safeguard against risks of a shorted or leaking circuit. In other embodiments, the pump is wired directly to the power source with an activation/deactivation switch wired into the circuit. Such power wiring for electrical components is well known and the present disclosure is not limited by any particular type of power wiring. Depending on the particular embodiment, a signal to activate or deactivate the relay, which advantageously is carried along smaller gauge wire than the wire supplying AC power from the relay to the pump, may originate from a sensor or may originate from a control component discussed in more detail below. In certain embodiments, the pump and relay are housed in a non-conductive and/or corrosion-resistant casing, which, in some embodiments, is located above ground, and, in other embodiments, is located below ground. In other embodiments, the pump and relay are located in different housings connected by a conduit through which the power wires run.

Signals originating from one or more sensors and/or a control component may also advantageously be used to disable the pump. For example, when the water level in the water reclamation tank is too low, when the sod is too moist, or when other contraindications to sprinkling or to use of the recycled irrigation pipes are detected, a signal to deactivate the pump (or to open its relay) may be sent. An alternative embodiment determines, for example via one or more water level and/or pressure sensors, that a particular minimum amount of water exists in the water reclamation tank 240 before activating the pump 270, and may, as needed, open a fresh water pipe valve 255 to allow water into the water reclamation tank 240 before activating the pump 270. The scope of these inventions is not limited by the means of activation or by the means by which an activation signal is conveyed to the pump 270, and many options for each are known.

Other embodiments may couple control of the pump 270 with control of the sprinklers 202, such that when the pump 270 is activated (by any of the means mentioned above as well as in any of the many other means known) sprinkling may be initiated. In one embodiment, any potential additional water inlets to the sprinklers 202 other than from the pump-based circuit may be closed. Thus, in these embodiments, when the pump 270 is activated the sprinklers 202 may also be activated. If the pump 270 does not activate or fails to send a sufficient flow of water, then some embodiments may draw water from another source, such as by opening a valve connecting the sprinkler pipe circuit to a fresh water inlet.

In one embodiment, it is possible that contaminants or sediment may be introduced to the water in the water reclamation tank 240, particularly in embodiments including a water reclamation tank 240 that contains water from sources other than the funnel 222. In this embodiment, filters may be deployed at the pump's intake line 276, at the pump's output line, within the recycled irrigation pipes 275, and/or at the sprinklers 202 (the latter location having the advantage of being readily accessible to users for cleaning, replacement or repair). For similar reasons, embodiments may include filters in the drain pipes 235 to filter water prior to its entry into the water reclamation tank 240 and/or where a fresh water inlet enters the water reclamation tank 240. In some embodiments, a filter may restrict the passage of particles, including sand, pebbles, rocks, and/or plant or animal debris. In other embodiments, a filter may restrict the passage of chemicals, such as, for example, the use of a carbon-based filter which may remove chemicals such as chlorine or chloramine. One of skill in the art will appreciate that many types of fluid filter apparatus may be used, including those in common use with irrigation piping, pool, spa or hot tub applications, may be used.

As can be seen in FIG. 2, the recycled irrigation pipes 275 can connect to sprinklers 202 that distribute the water above the surface. Thus, embodiments generally include a connection back to the surface that penetrates or bypasses the funnel 222 and the permeable layer 215. A straightforward implementation is for the recycled irrigation pipes to have their own isolated paths through the funnel 222 and the permeable layer 215, with an impermeable seal preventing water from escaping the funnel through the path. Another implementation is for the recycled irrigation pipes to extend beyond the edge of the funnel 222 and the permeable layer 215, as can be seen with the leftmost and rightmost sprinklers 202 in FIG. 2. In embodiments that use multiple funnels, irrigation piping may advantageously be configured to supply sprinklers located between adjacent funnels. In one embodiment, the recycled irrigation pipe 275 can be laid laterally, either above or below ground, to facilitate reaching sprinklers that cannot be easily reached via vertical recycled irrigation pipe 275 because of, for example, placement of funnel 222.

Additions, Particularly to the Funnel and the Water Reclamation Tank

Some embodiments include one or more fluid treatment apparatuses that have the ability to supply additives to water harvesting and reclamation system 200. In one embodiment, the additives can include any substance that may be added to the water harvesting and reclamation system 200 for enhanced function and/or additional advantage. For example, an additive can include fertilizer, pesticides, nutrient chemicals, disinfectant, purifiers, or a pH adjusting substance, to name a few. In some embodiments where, for example, regional life forms are tolerant to and naturally exist in environments where the water includes some amount of salt, such as coastal regions, additives may include salt, whether in solid or solution form.

Various methods of adding additives to the water harvesting and reclamation system 200 are possible. One example embodiment uses an additive chamber 354 associated with an additive installation system 350 as depicted in FIG. 3. In this embodiment, the additive installation system 350 can include an additive chamber lid 352 designed to prevent animals or debris from getting into the additive chamber 354. The additive chamber lid 352 is also useful for preventing children from accessing the additive chamber 354. Further, additive installation system 350 includes an additive drain 356 that enables the additive to enter, the water harvesting and reclamation system 200, such as, for example, via funnel 302. Additive installation system 350 is merely one embodiment of a fluid treatment apparatus.

In one embodiment, additive drain 356 can include a gate or valve. This gate or valve can be controlled manually by a user or by sprinkler management system 520, which is described below. Using the gate or valve, sprinkler management system 520 can control the amount of additive added to water harvesting and reclamation system 200 and the timing of the addition.

Other embodiments of additive installation system 350 are possible. For example, additive installation system 350 could be a basket that enables a user to drop a solid additive into the water harvesting and reclamation system 200. In such an example, some of the additive can be mixed with the water each time water drains through the funnel or a pipe and comes in contact with the solid additive. In another example, additive installation system 350 comprises an access port that allows a user to pour a liquid additive into the water harvesting and reclamation system 200 or to position a solid additive against or along the wall of a portion of water harvesting and reclamation system 200, such as the funnel. Those skilled in the art will recognize that any number of additive installation systems and additives are possible.

In one embodiment, the additive installation system 350 comprises a system configured to act on water harvesting and reclamation system 200 or water associated with the water harvesting and reclamation system 200. For example, the additive installation system 350 can include a purification system that emits UV radiation. Alternatively, other purification systems may emit energy in the form of rays or waves that may neutralize harmful organisms. Other examples can involve carbon filtering systems, reverse osmosis systems, and centrifuge systems, to name a few.

In one embodiment, locating the additive installation system 350 near the surface, as depicted in FIG. 3, enables a user to more easily replace or resupply additives, or repair the additive installation system 350, if necessary. However, other embodiments can include additive installation system 350, or additional additive installation systems, elsewhere. For example, additive installation system 350 can be located with or be part of funnel 302, water reclamation tank 240, sprinkler 202, or recycled irrigation pipe 275, to name a few. In one embodiment, additive installation system 350 can be located separately from water harvesting and reclamation system 200. In this embodiment, additive installation system 350 can be connected to water harvesting and reclamation system 200 through any appropriate means including a pipe leading from the additive installation system 350 to water reclamation tank 240 or any other appropriate section of water harvesting and reclamation system 200.

In one embodiment, the additive installation system 350 can be manually affixed to the funnel or even inserted directly into the funnel 302 using standardized attachment mechanisms whereby an attachment can be screwed or fitted into or otherwise affixed to the top or bottom of the structure covering the mouth of the funnel. In some embodiments where the funnel is subterranean, additive installation system 350 can be affixed to the top of the funnel mouth structure and may also be completely subterranean. It will be appreciated that one or more above-ground additive installation systems may be used to conveniently and advantageously add one or more additives as described. For example, the additive installation system can include a chamber through which water is pumped on its way to the sprinklers. Within such chamber, the water can be treated in one or more advantageous ways, for example, by exposing it to UV light, by filtering it with particular filters sensitive to certain undesirable minerals, particulate or other matter known to exist in or near the particular application, or by adding certain nutrients peculiarly or particularly suited for certain plants.

Although in many embodiments the water reclamation tank 240 is not readily accessible, in some embodiments it may be, and the water reclamation tank 240 may be an appropriate location for additives with particularly long lives or that otherwise benefit from being located in the water repository of the system. Water reclamation tanks 240 supporting attachments will generally have an opening on the top surface or high on an edge. However, other embodiments may use the drain pipe 235 to supply additives to water reclamation tank 240.

Note that the additives and/or additive installation system 350 that are appropriate for a particular embodiment may depend on the use of the water harvesting and reclamation system 200 and its location. An embodiment may conveniently and advantageously use more than one additive, either at separate or overlapping intervals of time or simultaneously.

The disclosure is not limited by particular types of additives or by the means by which additives can be affixed or introduced to different embodiments, as many such means known in the art are applicable to the water harvesting and reclamation system 200.

Combining Installations, Multiple Funnels

Figure 4:
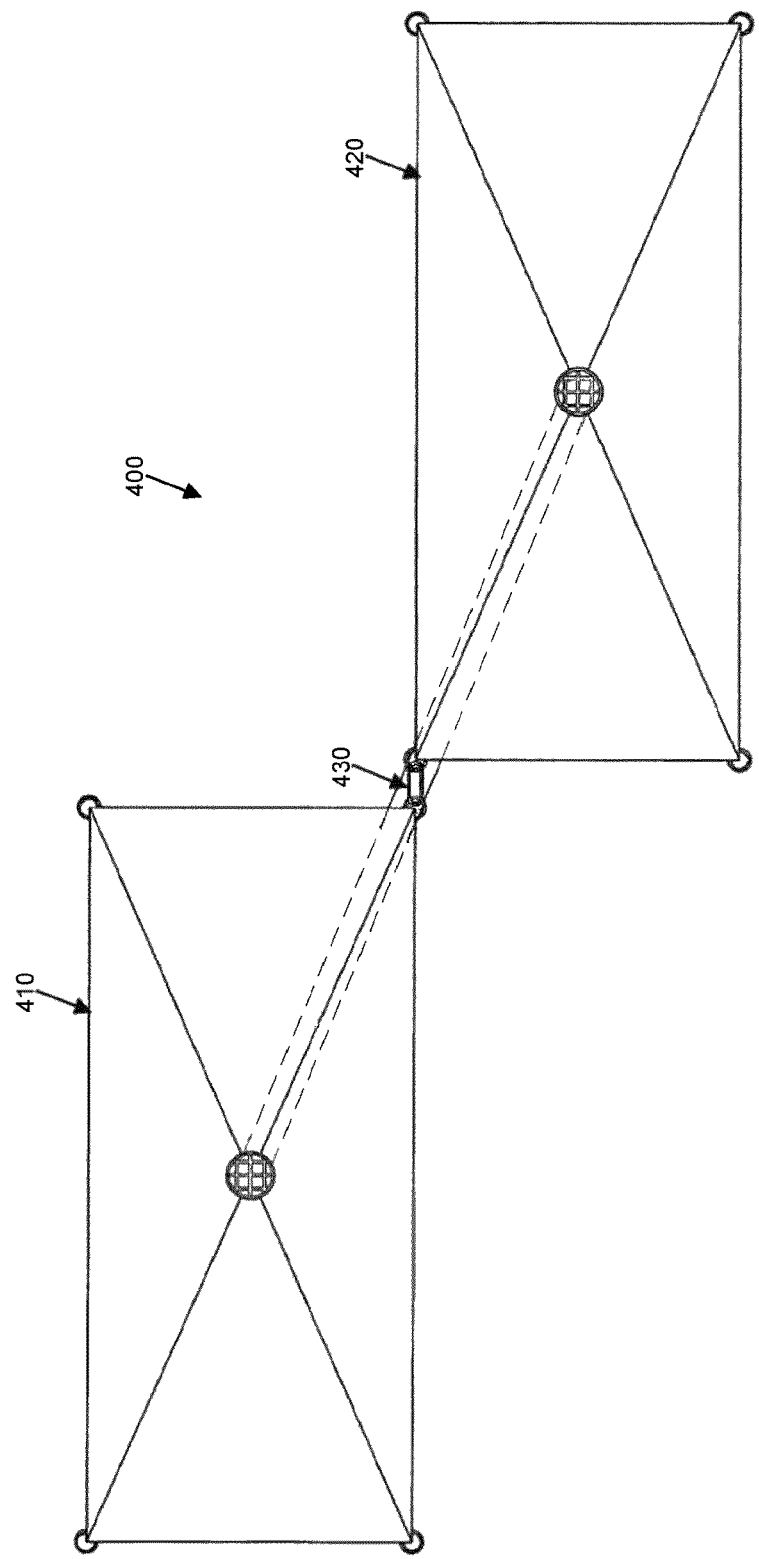
FIG. 4 illustrates a top-down view of an example embodiment of a multi-funnel water harvesting and reclamation system.

In some embodiments, water harvesting and reclamation systems may include multiple funnels, such as can be seen in FIG. 2. FIG. 4 illustrates another such example embodiment. FIG. 4 illustrates a top-down view of an example embodiment of a multi-funnel water harvesting and reclamation system 400. In some embodiments, the number of funnels differs from the number of water reclamation tanks or drain pipes. For example, water harvesting and reclamation system 400 can include one water reclamation tank (not shown) shared by both funnel 410 and funnel 420, or one water reclamation tank associated with funnel 410 and one water reclamation tank associated with funnel 420, or even two water reclamation tanks for each funnel. Some embodiments using multiple funnels may use an integrally formed multi-funnel structure, such as a single sheet of plastic formed to include two or more inverted pyramid structures, or other funnel-like shapes. Other embodiments using multiple funnels may use two or more physically separate funnel structures.

In some embodiments having two separate funnels, water harvesting and reclamation system 400 can include features that facilitate connecting funnels 410 and 420 to each other. These features may be external, such as a carabiner 430 or straps (not shown) that couple two or more funnels to each other, or they may be internal or integrated, such as tongue-and-groove mechanisms. The advantage of a carabiner or other flexible connection is that it allows for the funnels to be located at different angles and even to move independently if the substrate should move or shift, such as in the event of an earthquake. In some embodiments where the funnels are directly bonded to each other, the bond is watertight and can be lipped or angled so that any water reaching the junction point is necessarily directed towards one of the connected funnels. More than one funnel may meet, such as at the corner of the inverted, square pyramid-shaped funnels.

In one embodiment, the junction of one or more funnels enables the possibility of a recycled irrigation pipe and sprinkler being located between two funnels, as illustrated by the central sprinkler of FIG. 2. Some embodiments allow for this by having an edge of flexible but watertight material, which will accommodate but conform to a pipe. Other embodiments may use other methods, such as providing punch outs sized to fit standard pipes, and some embodiments may require the application of caulk or other sealants to maintain the watertight junction. In an alternative embodiment, junctions between funnels are not watertight, and can even include spacing. This is advantageous for allowing some moisture or water to remain uncollected to facilitate supporting desired life, such as earthworms.

In one embodiment, similar features for connecting funnels are used at the junction of two pieces of permeable layer. Although the borders of permeable layers may or may not correspond to the borders of any funnels beneath the permeable layers, some embodiments allow for the joining of permeable layers and for a recycled irrigation pipe to penetrate the permeable layers in a manner similar to that of the funnels. The method of joining the permeable layers depends on the substance of the permeable layers. In general any watertight sealant or adhesive can be used, but preferably one that is environmentally friendly. In some instances, heat or other external energy may be applied to create a seal. Just as suitable materials are widely known, so are methods of joining them. Although different embodiments may require different constructions as appropriate for the materials used, typically an intruding recycled irrigation pipe is accommodated. In one embodiment, this accommodation can occur by creating an appropriate opening in the layer, inserting the pipe, and then affixing additional permeable material as necessary to create a tight seal between the pipe and the patch material, and the patch material and the existing permeable layer.

Again, methods for creating water-tight intrusions through the funnel and the permeable layer and for joining pipes are widely known to those of ordinary skill and do not limit the scope of these inventions.

Instrumented and Managed Water Harvesting and Reclamation Systems

Figure 5:
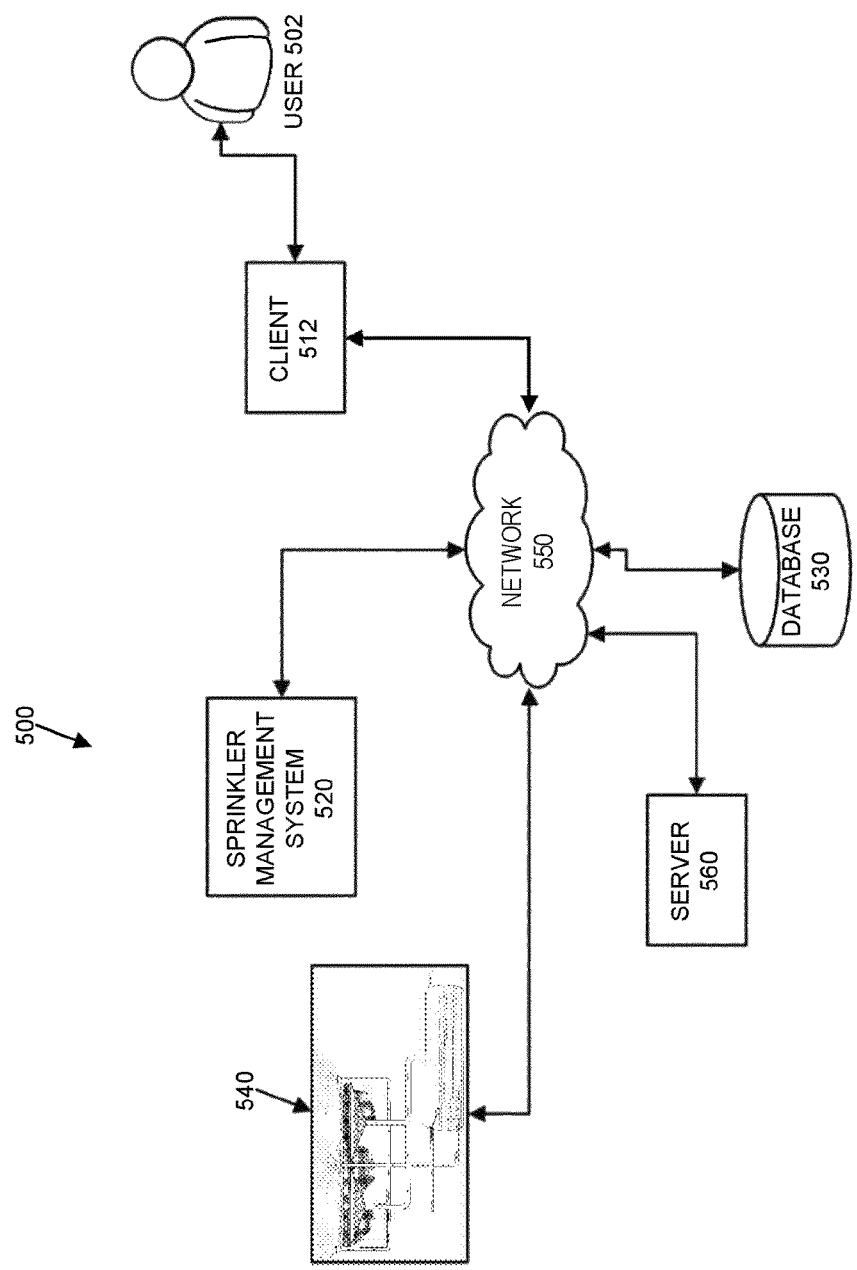
FIG. 5 illustrates an example embodiment of a water management system.

FIG. 5 illustrates an example embodiment of a water management system 500. The water management system 500 can include: client 512, sprinkler management system 520, database 530, water harvesting and reclamation system 540, network 550, and server 560. For simplicity, the water management system 500 is illustrated as including one of each element. However, one skilled in the art will recognize that the water management system 500 can include any number of elements. For example, water management system 500 can include multiple clients or multiple water harvesting and reclamation systems.

Client 512 can include any computing system that can communicate and interact with sprinkler management system 520, either directly or, as illustrated, via network 550. For example, client 512 can be a desktop computer, a laptop computer, a mobile phone, including both smartphones and "dumbphones," or a tablet, to name a few. In one embodiment, client 512 can be a computing device specially designed for interacting with sprinkler management system 520. For example, client 512 can be a wall unit as is typical with many existing sprinkler systems. In another embodiment, client 512 and sprinkler management system 520 can be included as part of the same device. In one embodiment, client 512 may be a "dumb" controller. In this embodiment, client 512 may not include a processor, but is configured to send commands to sprinkler management system 520 in response to input from user 502.

In one embodiment, client 512 may include special hardware configured to facilitate interaction with sprinkler management system 520. Alternatively, client 512 may include specialized software designed to run on off-the-shelf hardware and to interact with sprinkler management system 520. In another embodiment, user 502 can use a generic web browser on client 512 to interact with sprinkler management system 520 without the need for any specialized hardware or software. In this embodiment, user 502 accesses a user interface on sprinkler management system 520 in much the same manner as one may access a webpage on a website. This user interface is described in more detail below.

Sprinkler management system 520 can include any system for managing water harvesting and reclamation system 540, either automatically or in response to commands and/or preferences from user 502. In one embodiment, sprinkler management system 520 may be a local control unit that communicates with and controls various components of water harvesting and reclamation system 540 directly. Alternatively, as illustrated, sprinkler management system 520 can be located anywhere and can interact with water harvesting and reclamation system 540 via network 550.

In one embodiment, sprinkler management system 520 includes circuitry and logic appropriate for receiving and processing signals provided by sensors associated with water harvesting and reclamation system 540. In one embodiment, sprinkler management system 520 can include circuitry and logic appropriate for generating and transmitting control signals for components associated with water harvesting and reclamation system 540, such as one or more pumps, valves and/or lights that sprinkler management system 520 may activate or deactivate.

In one embodiment, sprinkler management system 520 includes a user interface that displays LED or LCD-based character or iconic output indicative of the values received from the sensors and/or indicative of the state of components (e.g., activated, deactivated, warning, error). This user interface may include buttons or switches or other controls for activating and deactivating components, such as, for example, one or more relays that activate components such as pumps, lights, or valves, and may include additional user-operable controls for setting water usage and/or operation parameters.

In another embodiment the sprinkler management system 520 may include a display screen for reporting sensor values and operating conditions. Sprinkler management system 520 may also use the display to depict a visual representation of the state of components of the water harvesting and reclamation system, such as displaying a representation of a water reclamation tank with a graphical indication of the level of water in the tank. As another example, sprinkler management system 520 may display a representation of one or more pipes or water collection components with a graphical indication of the level of water therein or flowing within. In similar embodiments, the display screen of the sprinkler management system 520 may present a graphical indication that sprinklers are operating.

In one embodiment, sprinkler management system 520 presents the user interface to user 502 via client 512.

In some embodiments, the sprinkler management system 520 may include a control component, including one that uses standard computer components, such as, for example, a processor (e.g., an AMD Athlon or Opteron, or Intel Core i5 or i7), volatile and non-volatile memory (e.g., respectively, one or more 1 GB RAM modules, and an Intel 80 GB SATA SSD unit or a Western Digital 500 GB SATA hard drive), a network interface card, video processor, and i/o ports such as, for example, one or more USB ports, serial ports, or parallel ports. In some embodiments, the control component includes: an operating system such as, Microsoft Windows 7, Linux, or Apple OS X, including networking protocols such as TCP/IP; a web server, such as, Apache; and a database, such as, Microsoft Access. It will be appreciated that, in such embodiments, sprinkler management system 520 may be a standard, desktop class personal computer, such as any of a number of models available from Dell, HP or Apple.

In one embodiment, sprinkler management system 520 may include a control component, including one that uses hardware specially designed for interacting with and controlling water harvesting and reclamation system 540. This application specific hardware may, for example, include a main circuit board having components clocked to a particular frequency. These components can include a processor, a memory (including, for example, an EEPROM), a power supply, analog-to-digital converters as necessary to process analog input values from sensors or components into digital representations, and a system bus connecting components and permitting the processor to access a number of registers. The registers may be configured to hold particular values which, for example, correspond to a digital representation of sensor values. Additionally, sprinkler management system 520 can include LED or LCD character-based displays that provide feedback to users who are setting, controlling and/or monitoring the system. Further, sprinkler management system 520 may include a plurality of connectors for connecting sensors, solenoids and/relays. Such components and the requirements for their proper interconnection are well known in the art. In this embodiment, software-based instructions may be loaded into the EEPROM memory to be executed by the processor to effect control of the water harvesting and reclamation system.

In one embodiment, sprinkler management system 520 may be implemented on any standard computing device, such as a laptop, notebook, netbook, notepad, tablet computer or handheld processing device such as a PDA or smartphone, including an Android-based handheld unit or an Apple iPhone or iPad. In this embodiment, sprinkler management system 520 includes an application configured to interact with water harvesting and reclamation system 540. In one embodiment, the application can process signals the sprinkler management system 520 receives from the water harvesting and reclamation system 540. Further, the application can cause sprinkler management system 520 to display monitoring and status information indicative of the state of the water harvesting and reclamation system 540 based on the received signals. The application may also be configured to receive user input regarding the operation of the water harvesting and reclamation system 540. In this embodiment, sprinkler management system 520 can then forward appropriate signals to one or more components of the water harvesting and reclamation system (such as one or more pumps or valves) to carry out the operation(s) desired by the user 502.

In one embodiment, the application may be coded in assembler, C, Pascal, BASIC or other programming language. Those of ordinary skill will further appreciate that drivers may be advantageously used to provide a programmatic interface to sensors and mechanical components. The application can use such drivers to facilitate receiving and processing sensor input, calibrating and controlling the sensors, receiving feedback from mechanical components (such as error conditions), and sending command signals to mechanical components such as pumps, lights, valves, relays and the like. In particular embodiments, one or more drivers may provide software-based access to the value of a signal originating in a component, such as a sensor, and propagated to and existing in a hardware register. Such a driver provides an effective interface between the application and hardware component. Thus, in one embodiment, wire-based signals are propagated from sensors and mechanical components such as a pump and valves, to connections on a circuit board, for example, a circuit board formatted and designed to fit as a PCI card in a standard PCI slot in a personal computer. Those of ordinary skill will appreciate that it is well known to use PCI cards and corresponding software drivers to interface sensors and mechanical components to applications operating on a personal computer. It is equally well understood that a PCI card may contain one or more connectors (often exposed in a rear panel of a personal computer) configured to receive or to transmit signals in a variety of forms. In certain embodiments, the application and drivers may operate under the Microsoft Windows operating system, such as Windows 7, a 64-bit operating system. But it will be appreciated that the application and driver development tools can exist in connection with other operating systems, such as Unix or Linux, or with operating systems offered by Apple Computer.

In particular embodiments, the sprinkler management system 520 receives signals from sensors associated with water harvesting and reclamation system 540 and processes the signals, e.g., by smoothing signals, removing noise, converting analog signals to digital representations, and/or interpreting or interpolating the received signal values in accordance with or to correspond to a different value range. One of ordinary skill will appreciate that the signals, processed or not, may be propagated to sprinkler management system 520 over a standard USB, serial or parallel data connection, and/or may be propagated wirelessly, for example by using packetized data streams transmitted at data-range radio (or other) frequencies. One of ordinary skill will also appreciate that, in certain embodiments, the sprinkler management system 520 generates control signals and transmits them directly or via network 550 to water harvesting and reclamation system 540. These control signals can activate/deactivate electrical components, such as pumps, valves and/or lights, to control operation of the water harvesting and reclamation system 540. In certain embodiments, the sprinkler management system 520 transmits control signals to an intermediate control component (not shown) that propagates the signals to relays for operating one or more pumps, valves or lights.

In one embodiment, a web server can provide web pages to facilitate user 502 monitoring and controlling water harvesting and reclamation system 540. This web server can be included with sprinkler management system 520, or can be a separate server, such as server 560, which can communicate with sprinkler management system 520 directly, or via network 550. The web server can serve a status page that presents representations of characteristics of the water harvesting and reclamation system 540. These characteristics are determined by sprinkler management system 520 from signals provided by one or more sensors installed at various locations in the water harvesting and reclamation system 540 and/or determined from operative states indicative of the operating status of one or more pumps, valves and/or lights or other components.

In one embodiment, a monitor routine may execute on sprinkler management system 520 to read current values provided by one or more sensors and/or to determine operating states of one or more relays, pumps, valves or lights, and/or to record such values in database tables along with the present date and time. In one embodiment, when the web server receives a request for the status page, it accesses a template status page, which includes programmatic scripts with embedded database queries. Sprinkler management system 520 or server 560 can execute these queries to access a database, such as database 530, to retrieve the most recent sensor and operating state values stored therein, for example by retrieving such values associated with the most recent date, and to use those values to dynamically complete an instance of the status page, which is then served to the requesting web browser associated with client 512. Alternatively, sprinkler management system 520 or server 560 can execute a script or other module that reads the present values provided by one or more sensors and/or determines the present operating states of one or more relays, pumps, valves or lights, and processes such values as appropriate to dynamically complete an instance of the status page, which is then served to the requesting web browser associated with client 512. Using such example embodiments, users located anywhere in the world with access to the Internet may use a web browser to determine the status of and control the water harvesting and reclamation system 540.

In one embodiment, the status page, when received by a web browser, causes the web browser to display to a user a graphical representation of one or more systems associated with the water harvesting and reclamation system 540. For example, the status page may illustrate the amount of water currently residing in a water reclamation tank, a graphical representation of one or more pipes including representations of flowing, inactive and/or possibly blocked pipes (e.g. such as when a flow sensor indicates that water is not flowing but a signal has been sent to activate the pump), a graphical representation of the state of one or more relays (e.g., depicting a pump relay in an activate state in which the relay has been activated to provide power to a pump, depicting a valve relay in a deactivate state in which no power is being supplied to a valve, depicting a light relay in an activate state in which power is being provided to a light), a graphical representation of the state of one or more pumps (e.g., depicting the pump in an activate state actively pumping or in a deactivate state), a graphical representation of the state of one or more valves (e.g., depicting a fresh water fill valve as open to allow water into the water reclamation tank), and/or a graphical representation of the state of one or more lights (e.g., depicting a light as actively providing light).

Water harvesting and reclamation system 540 can include any configuration of a water harvesting and reclamation system as described in this disclosure. In one embodiment, water harvesting and reclamation system 540 can represent multiple water harvesting and reclamation systems. In one embodiment, the water harvesting and reclamation system 540 is configured to send status information to sprinkler management system 520 and to receive control signals from sprinkler management system 520. In this embodiment, the sensors and control logic of water harvesting and reclamation system 540 can be monitored and controlled either locally or remotely, and either alone or in combination with similar systems in different geographical areas. Thus, a user, from a single location, virtually anywhere in the world, can monitor and control one or more water harvesting and reclamation systems.

Network 550 can include any type of network for facilitating communication between various computing systems. For example, network 550 can include a LAN or a WAN. Further, network 550 can be a wired network, a wireless network, or a combination of the two. In one embodiment, network 550 includes the Internet.

Database 530 includes any database system capable of storing sensor information associated with water harvesting and reclamation system 540. The Database 530 may be a flat file system, may be a hierarchical data storage system, or may preferably be an SQL-compatible relational database system. In some embodiments, database 530 may also store control preferences for the water harvesting and reclamation system 540 or the sprinkler management system 520. In another embodiment, database 530 may also store: weather information; land condition information, such as moisture levels or acidity; parts information; and any other information that facilitates running and maintaining water harvesting and reclamation system 540. In particular, in some embodiments, database 530 may store records including a water harvesting and reclamation system ID, which uniquely identifies a particular water harvesting and reclamation system, values associated with each sensor, values associated with operating states of each component, values representative of command signals provided to each component, the date and time of each sensed value, determined operating state, and/or provided command signal, data indicative of water usage, and data indicative of additive usage.

Sensors and Controls

Figure 6:
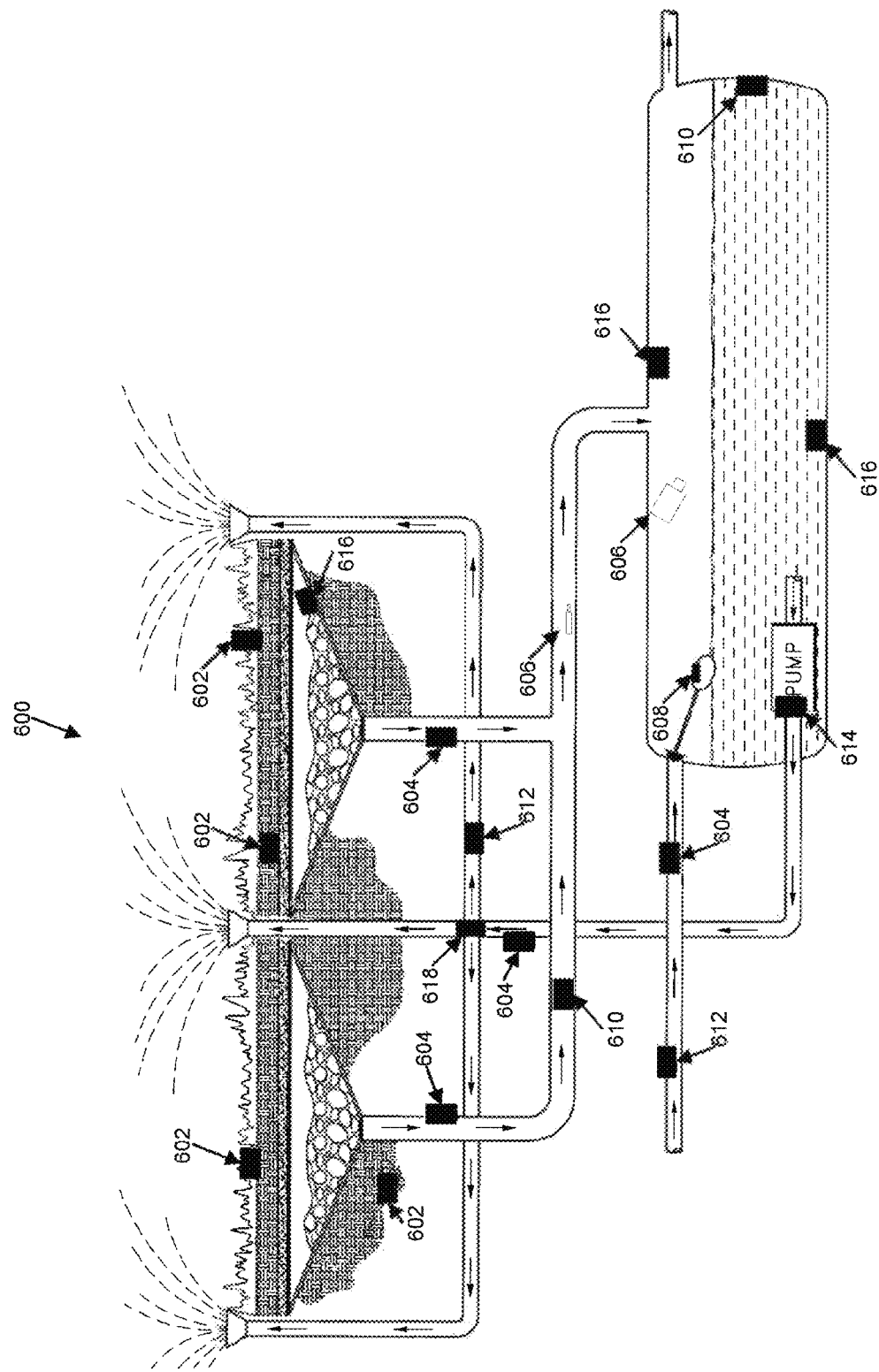
FIG. 6 illustrates an example embodiment of a water harvesting and reclamation system that includes sensors and controls.

FIG. 6 illustrates an example embodiment of a water harvesting and reclamation system 600 that includes sensors and controls. In one embodiment, the sensors and controls can communication with each other. For example, autonomic management functions can be implemented by valve and shunt controls which are in communication with flow sensors and possibly a user interface control. Some embodiments include components that are in communication with sprinkler management system 520, as discussed above. Some embodiments may include components which are in communication with one or more other components and with one or more sprinkler management systems.

FIG. 6 illustrates a number of example sensors and controls that can interact with various components associated with water harvesting and reclamation system 600. These examples include: ground sensors 602 for monitoring moisture levels, nutrient levels, and other properties of soil; flow sensors 604 for monitoring the rate of water flow through the system; cameras 606 for providing visual or infrared images of the system; float sensor 608 for determining the volume of water in the water reclamation tank; water sensors 610 for measuring acidity levels, contaminant levels, temperature, and other properties of liquid in the system; valves 612 for controlling maximum flow rates through the system; pump control 614 for controlling the operation of a pump; additive dispersers 616 which control the rate at which additives are released into the system, and shunts 618 which can be used to route the flow of liquid through the system.

An embodiment of an instrumented water harvesting and reclamation system 600 may be comprised of components such as the following commercially available sensors, as well as similar products and successor products. These products are identified as examples to facilitate creation of various embodiments of the water harvesting and reclamation system disclosed herein. However, the water harvesting and reclamation system is not limited to the components identified below and any number and variety of other products and systems can be used with the water harvesting and reclamation system.

Water flow can be measured using an ultra-sonic doppler flowmeter attached outside of a pipe to measure fluid flowing inside. Such a meter can measure fluid flow from 0.05 to 9 mps in pipes ranging from 6 mm to 3 m in diameter, and provides an output signal from 4 to 20 mA in a 12-bit resolution. Transit-time flow meters, which can advantageously operate with cleaner/more purified water, can also be used, such as the FDT-series from Omega Engineering Inc. of Stamford, Conn. (http://www.omega.com/Green/pdf/FDT-30_Series.pdf.) Rotameters, paddle meters, or other inline flow meters may also be used.

Water temperature can be measured using one or more of a variety of sensors, including a hermetically sealed thermocouple which can be sterilized and is capable of measuring temperatures from well below freezing to, if need be, well above boiling, with a response time of under 4.5 seconds in water flowing at three feet per second and an accuracy of the greater of plus/minus 0.5% or one degree Celsius. Such a thermocouple can, for example, be combined with a wireless transmitter, such as the MWTC-A-K-915 from Omega Engineering Inc. That transmitter can send data to a receiver up to 90 meters away and will transmit the raw data from the thermocouple as well as an ambient temperature. Such transmitters can be chained together, as appropriate. One of ordinary skill in the art will understand that a broad range of temperature sensors such as the one described and other sensors suitable for measuring the temperature of water, surrounding soil, air, and even other components are presently available and can be used in connection with embodiments of the present invention. (see, e.g., http://www.omega.com/temperature/tsc.html).

An example of a depth or volume gauge suitable for use in the holding tank is a two wire liquid level float transmitter, which continuously monitors the water level and produces a 4-20 mA output proportional to that level, with an accuracy of 6.35 mm over a range of 12.7 cm to 1.8 meters of depth. An alternative is a continuous level reed switch, which has advantages related to being field repairable and requiring limited intrusion to the tank for maintenance. One example of a continuous level reed switch is the LVR200 series from Omega Engineering Inc.

Solenoid valves may be used in certain embodiments. Many such valves can be controlled remotely or electronically. For example, the SV3100 series of 2-way valves from Omega are normally closed, can open in 10-80 milliseconds depending on configuration, and close in 20-30 milliseconds. Similar valves, such as SV3300, are also available in normally open or normally closed configurations. Multiple of these valves, or three-way valves, can be used to create shunts.

Omega's PHP-700 series pumps allow for controlling the release of chemicals and other additives based on the properties of the water, operating at a range of 0-14 pH, and 0 to ±999 mV, with a resolution of 0.01 pH and 1 mV and an accuracy of ±0.01 pH and 5 mV. These and similar pumps output 4-20 mA, and operate in a 0-50° Celsius environment.

Many products are suitable for use as pH sensors for both the water and soil in a water capture and recycling system, such as, for example, Omega's PHE-7357-10, PHE-5551-10, ORE-7357-10, and ORE-5551-10 sensors.

The outputs from the listed sensors can be transmitted wirelessly via Omega's line of wireless transmitters and wireless sensors. The UWTC-NB9, for example, will transmit ambient and sensor temperature, signal strength, and battery status up to 120 meters. The zED-P line of products can transmit a higher powered wireless signal. The UWXL series operates at 2.5 GHz, transmit at a user configurable 2 sec to 120 sec sample rate, and have a 63 mW RF output power, yielding a projected range of up to 90 meters in an urban or indoor environment. It can be battery-powered, with an expected battery life of three years. Each of these transmitters, or other products from the Omega product line such as the NOMAD products, can be coupled to a wide range of sensors for use in an instrumented water capture and recycling system. Orbit Communications also provides a variety of products for transmitting analog and other sensor data wirelessly and for relaying back control information, such as, for example, their Bridge and AnalogBridge products which may be appropriate for use in some embodiments.

While some of the above mentioned sensors or similar products may be used to measure pertinent conditions, other instrumented water capture and recycling systems may use products from Onset Computer Corporation of Bourne, Mass., such as its W-SMC HOBOnode soil moisture sensor. That device measures 0 to 100% volumetric water content with an accuracy of 3.1% and a precision or resolution of 0.07%. It can communicate wirelessly to a receiver or a repeater using the IEEE 802.15.4 wireless standard on a 2.4 GHz band. A more sensitive, but wired, product is the S-SMA-M005.

Video and still cameras are in wide use for pipe inspections and many suppliers provide appropriate camera and cabling systems. For example, Inuktun Services Ltd of British Columbia, Canada provides Spectrum and Crystal cameras as small as 22 mm or ⅞ of an inch in diameter and suitable for use in pipes and tanks. The RC-12 wireless mini camera from RF Co., Ltd of Nagano, Japan has a waterproof case, a width of 18 mm, and can run for up to 45 minutes per charge, making it appropriate for occasional use or for deployment in conjunction with a power cable threaded through the water capture and recycling system.

As with the other components, a wide variety of pumps may be used. A submersible centrifugal pump might be installed in the water tank, including any of the pumps from the Berkeley Pumps L6TS series, or the 90 series from Sta-Rite Industries of Delavan, Wis. As will be appreciated by one of ordinary skill in the art, the precise choice of pump in a given installation will depend on the head, the desired flow rate, and other context dependent properties. Non-submersible centrifugal and turbine pumps, as well as other types of water pumps, may also be used. In a typical embodiment the pump is associated with a controller, which supports a wireless interface. For example, the components used in the Orbit Communications Pty Ltd of Wyong, Australia EverPump wireless tank monitor and pump control system may be appropriate for use in some embodiments.

Remote Control Technology of Kirkland, Wash. provides components in its Wireless Data Controller and Wireless Automation System 2 DA product lines that wirelessly transmit temperature, pressure, flow rate, and other reporting and control signals over a network.

A wide variety of other instruments and controls are currently available or likely to become available in the future, many of which could be advantageously integrated into a recapture and recycling system by one of skill in the art. As communications technology develops and depending on the context in which the system is deployed, the various instruments may be in communication with each other or with a control unit via wired or wireless communications means.

Sprinkler Management System Architecture

Figure 7:
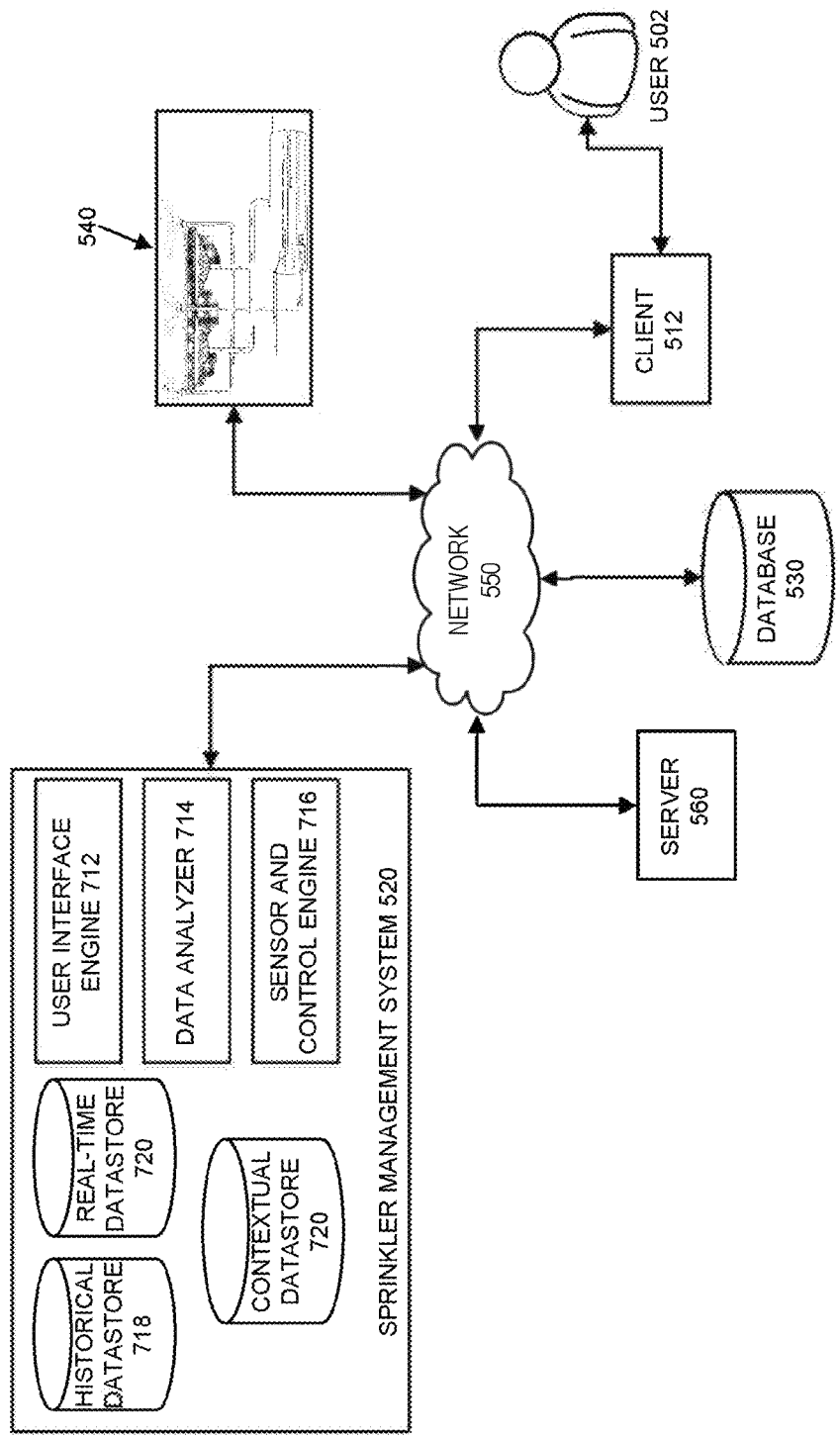
FIG. 7 illustrates an example logical architecture of sprinkler management system 520.

FIG. 7 illustrates an example logical architecture of sprinkler management system 520. Such an infrastructure may be implemented on one or more computing machines, using a combination of hardware and software. It may be completely implemented in software or hardware. Although various components of the infrastructure are illustrated in a way that makes them appear to be collocated on a common hardware/software substrate, any or all of the components may be remote from each other, and components that are illustrated as atomic units may be distributed among multiple computing substrates.

As can be seen in FIG. 7, sprinkler management system 520 can communicate via network 550, or directly, with water harvesting and reclamation system 540. In one embodiment, sprinkler management system 520 can communicate with individual sensors, components or instruments associated with water harvesting and reclamation system 540.

In one embodiment, sprinkler management system 520 includes a user interface engine 712, a data analyzer 714, and a sensor and control engine 716. Sprinkler management system 520 can also include a number of datastores, such as historical datastore 718, real-time datastore 720, and contextual datastore 722. A particular embodiment need not include all of these components to manage a water harvesting and reclamation system in accordance with this disclosure, and some embodiments may include additional components.

The user interface engine 712 is configured to present an interface that the user 502 may use to monitor or manage the water harvesting and reclamation system 540. Examples of such an interface are discussed below. The user interface engine 712 can also route inputs received via the interface to the appropriate components of the sprinkler management system 520.

In some embodiments, the sensor and control engine 716 processes and executes commands received from the user interface engine 712. Further, the sensor and control engine 716 processes data received from the sensors and controls associated with the water harvesting and reclamation system 540. For example, if user 502 specifies that a valve is to be closed then the user interface engine 712 relays request to the sensor and control engine 716, which will generate appropriate signals to cause the valve associated with the water harvesting and reclamation system 540 to close. If the user 502 requests information about a particular aspect of the water harvesting and reclamation system 540, the sensor and control engine 716 may execute a monitoring module that receives and processes data from one or more sensors. In one embodiment, sensor and control engine 716 will then pass the sensor data to user interface engine 712 to be presented to user 502. In another embodiment, sensor and control engine 716 passes the sensor data to data analyzer 714 for analysis. User interface engine 712 then causes the result of the data analysis to be presented to user 502, such as by formatting the data for presentation in an HTML-based web page which is served to user 502's web browser on client 512.

In one embodiment, the sensor and control engine 716 can store received sensor data from water harvesting and reclamation system 540 in a real-time datastore 720. This embodiment may facilitate processing of sensor data by data analyzer 714. In one embodiment, sensor and control engine 716 obtains sensor data automatically on a continual or periodic basis. In this embodiment, recent sensor data can be stored in the real-time datastore 720 indefinitely, for a pre-defined period of time, until user 502 requests access to the data, or until user 502 deletes the data. To facilitate useful and flexible access to real-time data collected over a period of time, the sensor and control engine 716, or a similar standalone module, may automatically poll sensors and components and store associated data in the real-time datastore 720. In particular, for example, the sensor and control engine 716 may read the value of each sensor and save a digital representation of each value in a record in the datastore 720, where the record may be indexed by the unique water harvesting and reclamation system ID and also the date and time on which the sensor values were read.

In other embodiments, the sensor and control engine 716 can store received sensor data in historical datastore 718. In this embodiment, historical datastore 718 can be optimized to support more complicated queries than real-time datastore 720, which is optimized to provide near instantaneous (preferably sub-second) access to data. The sprinkler management system 520 may also store additional data in the historical datastore 718, such as, for example, data representative of each command sent to each component of the water harvesting and reclamation system, data representative of the watering schedule used each day, and data representative of each change made to the watering schedule. Each of these data may also be indexed by the unique water harvesting and reclamation system ID and by the date and time of each command, watering schedule or change to watering schedule. One of ordinary skill will appreciate that SQL-based database commands may be readily formulated to store and index such data items in the historic datastore 718, and also to retrieve such data from the historic datastore 718 as needed.

In one embodiment, contextual datastore 720 stores data obtained from sources other than the water harvesting and reclamation system 540. For example, the contextual datastore 720 can include weather information obtained from server 560, which, in one embodiment, can be associated with a weather and climate service. This weather data can be used to facilitate controlling the water harvesting and reclamation system 540, such as by determining whether to skip a prescheduled sprinkler activation or whether to activate a fresh water intake to a water reclamation tank. As a second example, the contextual datastore 720 can include model information identifying the main model number for the water harvesting and reclamation system, particular software version, and particular models of components of the water harvesting and reclamation system 540. This information can be used, for example, to warn user 502 when an additive may need replacing, or when a part may need maintenance. One skilled in the art will recognize that the contextual datastore 720 can include a variety of other data from various sources that can facilitate sprinkler management system 520 managing the water harvesting and reclamation system 540.

In one embodiment, user interface engine 712 can cause any of the information stored in the datastores 718, 720, 722 to be presented to the user 502 to both inform the user 502 and to facilitate user 502 configuring the water harvesting and reclamation system 540. Similarly, data analyzer 714 can use any of the data stored in the datastores 718, 720, 722 to facilitate executing an analysis request from user 502 or sensor and control engine 716. For example, data analyzer 714 can use real-time datastore 720 and historical datastore 718 to determine if sensor readings associated with the water harvesting and reclamation system 540 are outside of a historical average. In particular, the data analyzer 714 may be configured to perform more sophisticated analysis, such as analysis involving information obtained from multiple sprinkler management systems. In another example, data analyzer 714 can evaluate the performance of the water harvesting and reclamation system 540 as a whole or of its constituent parts against the properties set forth in a parts catalog, or against the performance of other water harvesting and reclamation systems. Both of these pieces of information can be stored in contextual datastore 720. Also advantageously, the data analyzer 714 may, in response to a user 502's request for an estimate of water usage over a specified period of time, formulate and present queries to retrieve data from the datastores 718, 720, 722, such as, for example, data representative of volume capacity of the reclamation tank 240, data representative of water levels in the reclamation tank 240 each day in the requested time period, data representative of water flow through a fresh water intake 250 for each day in the requested time period, and may use such data, along with a user-specified to calculate an estimate of water usage for a requested period of time.

As discussed above, the sprinkler management system 520 may obtain or receive data from external databases or services such as historical and predictive weather services or part catalogues. In one embodiment, sprinkler management system 520 may be configured to contribute data to external systems and databases. For example, sprinkler management system 520 can report local detected weather conditions to a weather bureau. As a second example, sprinkler management system 520 can report the status or performance of components associated with water harvesting and reclamation system 540 to manufacturers of the components.

In one embodiment, sprinkler management system 520 can store or retrieve data from an external database 530. This enables sprinkler management system 520 to create backups of the datastores, to store data analysis create by data analyzer 714 in a central repository, or to obtain data from third party systems. In one embodiment, any number of the datastores can be offloaded to database 530.

In one embodiment, the user interface engine 712, data analyzer 714, and sensor and control engine 716 may be provided in a distributed fashion.

Multiple Water Harvesting and Reclamation Systems

Figure 8:
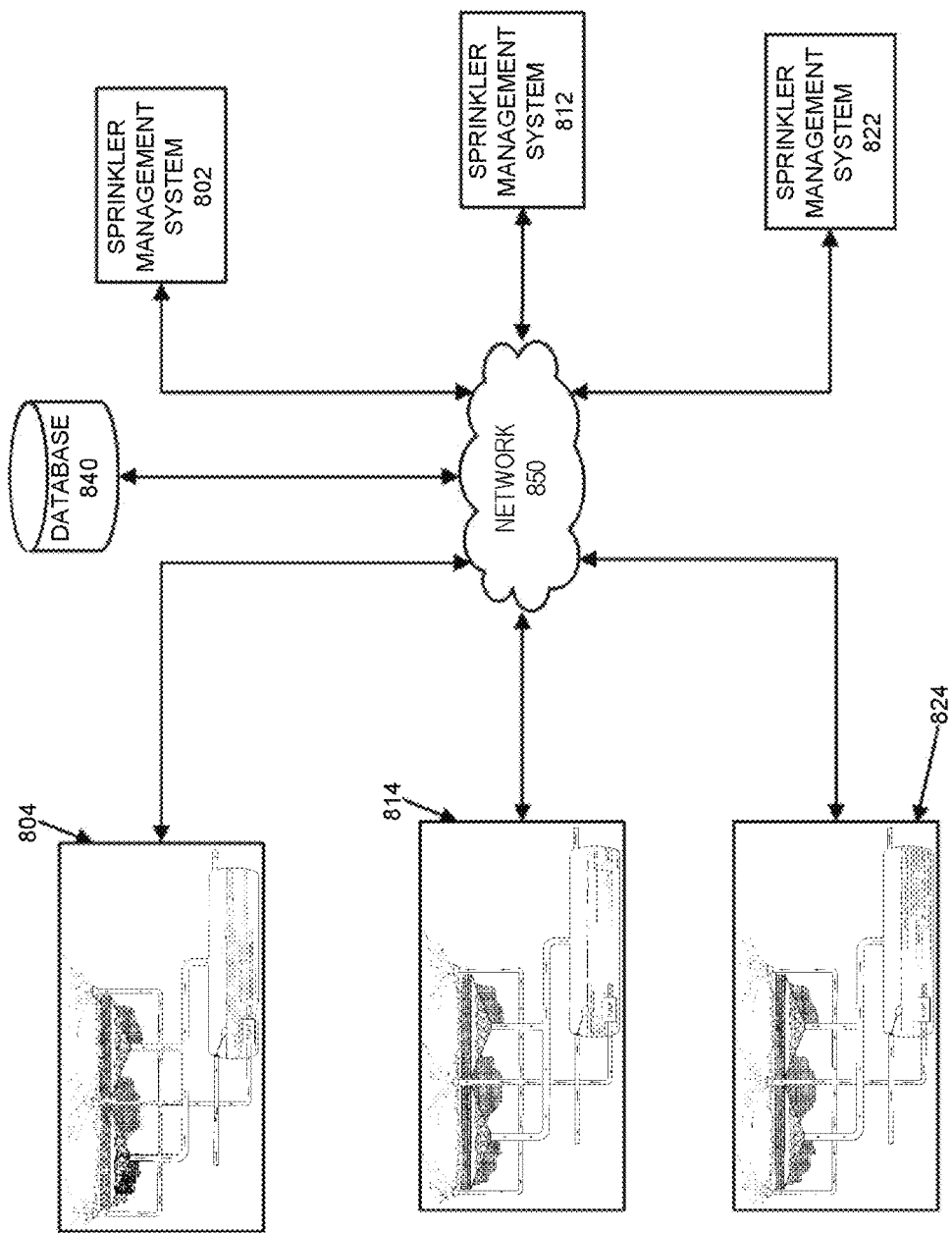
FIG. 8 illustrates an example embodiment of multiple water harvesting and reclamation systems.

FIG. 8 illustrates an example embodiment of multiple water harvesting and reclamation systems. FIG. 8 illustrates: water harvesting and reclamation systems 804, 814, and 824; sprinkler management systems 802, 812, and 822; database 840; and network 850. Each of the elements of FIG. 8 can comprise any of the previously described embodiments related to those elements.

In one embodiment, water harvesting and reclamation systems 804, 814, and 824 are associated with sprinkler management systems 802, 812, and 822 respectively.

In one embodiment, a sprinkler management system can control multiple water harvesting and reclamation systems. For example, sprinkler management system 802 can be configured to control water harvesting and reclamation systems 804 and 824. This embodiment can, for example, be used to enable one sprinkler management system to control a water harvesting and reclamation system installed in a front yard and a water harvesting and reclamation system installed in a back yard.

In one embodiment, sprinkler management system 802 can provide data obtained from water harvesting and reclamation system 804 to sprinkler management system 812. This embodiment may facilitate configuration of a newly installed water harvesting and reclamation system or richer analysis and control of each water harvesting and reclamation system.

Alternatively, the previous embodiment could enable a "master" sprinkler management system to control local sprinkler management systems. For example, suppose that sprinkler management system 802 is associated with both water harvesting and reclamation system 804 and 814, and that sprinkler management system 822 is associated with water harvesting and reclamation system 824. Further, suppose that sprinkler management system 812 is a "master" sprinkler management system. In this example, sprinkler management system can either control sprinkler management systems 802 and 822 or limit the configurations sprinkler management systems 802 and 822 can accept from associated users. This example could be used by a homeowners association or a central water management district, such as a town, to limit water overconsumption. "Master" sprinkler management system 812 can use data associated with water harvesting and reclamation system 804 814, and 824, which is obtained from sprinkler management systems 802 and 822 directly or via data stored in database 840, to determine how to control sprinkler management systems 802 and 822. Alternatively, or in addition, "master" sprinkler management system 812 can make its determination based on external data, such as weather reports obtained from database 840, or from water harvesting and reclamation system operation rules received from an authorized user. Each sprinkler management system, through appropriate secure access, such as, for example, use of unique login and password information, may advantageously provide access to one or more water harvesting and reclamation systems. Differing access levels may be employed in some embodiments such that some users may be provided "read" access to a water harvesting and reclamation system, while other users may be provided "write" access with the ability to modify system configuration information, including setting or changing the watering schedule, and overriding the watering schedule such as to prevent watering for some temporary period. In addition, "master" usernames and passwords may be identified that provide higher preference than other usernames and passwords, such that if two authorized users both have "write" access and if only one of them has a "master" status, then the settings provided by the user with "master" status will take precedence of other settings. In some embodiments, only one "master" username and password may be authorized.

User Interface

FIGS. 9A-9E illustrate an example embodiment of a user interface 900 that can be generated by a user interface engine 712 associated with a sprinkler management system 520. User interface 900 is illustrated as a web-based interface useful over the internet that includes a number of webpages viewed via a web browser. In one embodiment, user interface 900 can be configured to use any type of web development standard or software. For example, user interface 900 can use JavaScript, Flash, or Perl scripting, to name a few. In one embodiment, user interface 900 can comprise any application that can be viewed or accessed via a browser. Note that user interface 900 is not limited to a web-based or browser-based implementation. In one embodiment, user interface 900 can be any custom application that enables user 502 to interact with the sprinkler management system 520. Although user interface 900 is not limited to a web or browser-based implementation, to facilitate discussion, the rest of this section will assume such an implementation.

In one embodiment, user interface 900 can include several tabs that enable user 502 to access various features of user interface 900 and sprinkler management system 520. Alternatively, the various features can be accessed via dialog boxes, menus, windows, and any other user interface element known to those skilled in the art.

Figure 9A:
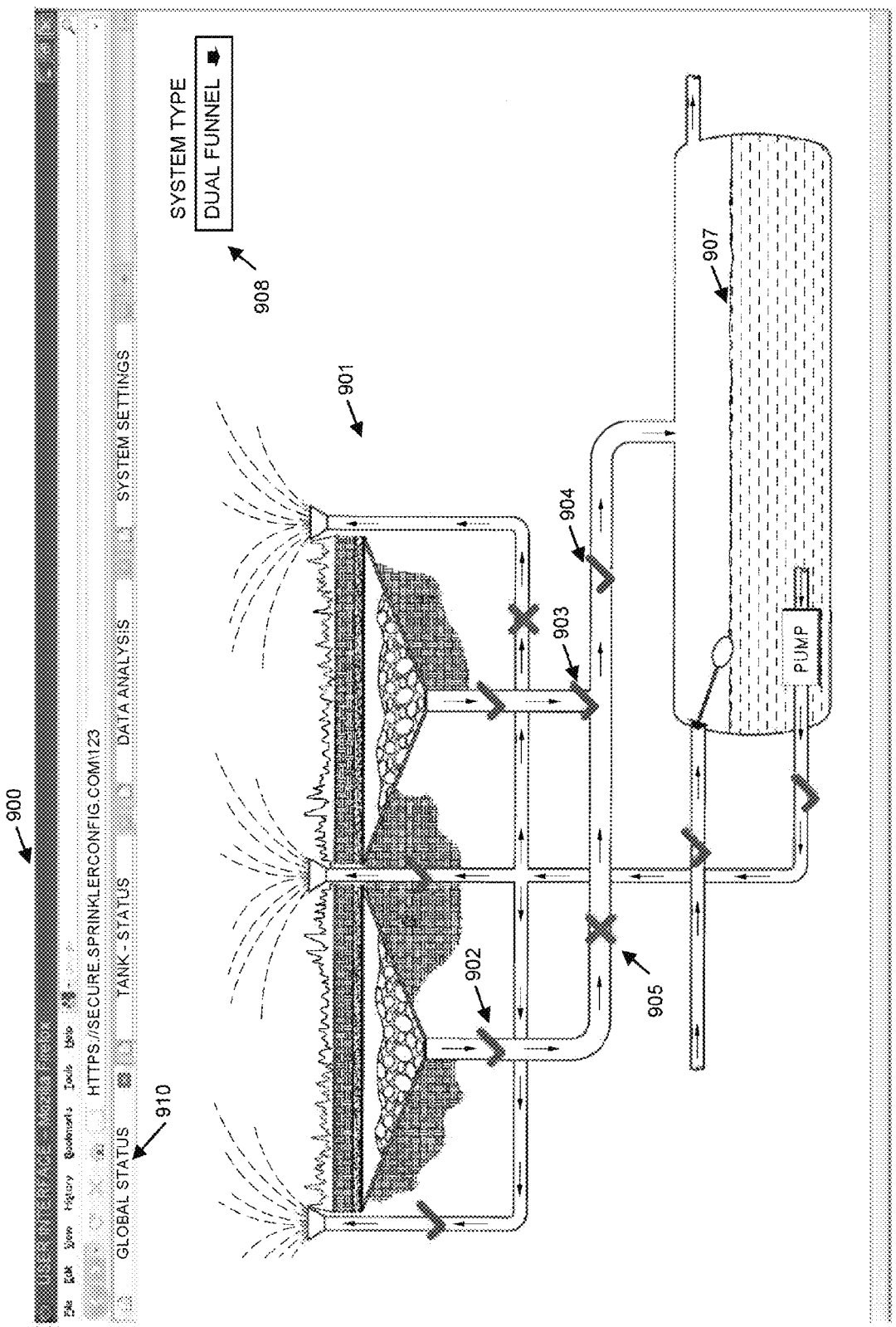
FIGS. 9A-9E illustrate an example embodiment of a user interface that can be generated by a user interface engine associated with a sprinkler management system.

FIG. 9A illustrates a global status tab 910 associated with user interface 900. The global status tab 910 enables the user 502 to view the status of the entire water harvesting and reclamation system 540. The global status tab 910 includes a system image 901 that represents the water harvesting and reclamation system 540. In one embodiment, system image 901 can be a real to life representation of water harvesting and reclamation system 540. In this embodiment, the real to life representation can be preloaded into user interface engine 712. Alternatively, the real to life representation can be created in real-time, or during a one-time initialization step, by the use of component identification information provided by the various components associated with the water harvesting and reclamation system 540. In another embodiment, system image 901 is a representative image of water harvesting and reclamation system 540, which may or may not be 100% true to life. In this embodiment, user interface engine 712 may automatically detect the most true to life representation of water harvesting and reclamation system 540 for system image 901. Alternatively, the user 502 can select the most accurate representation of water harvesting and reclamation system 540 using, for example, a system type input element, such as system type dropdown menu 908.

In one embodiment, system image 901 may be schematic or pictorial. Alternatively, system image 901 may be an animation or a video of water harvesting and reclamation system 540.

Figure 9B:
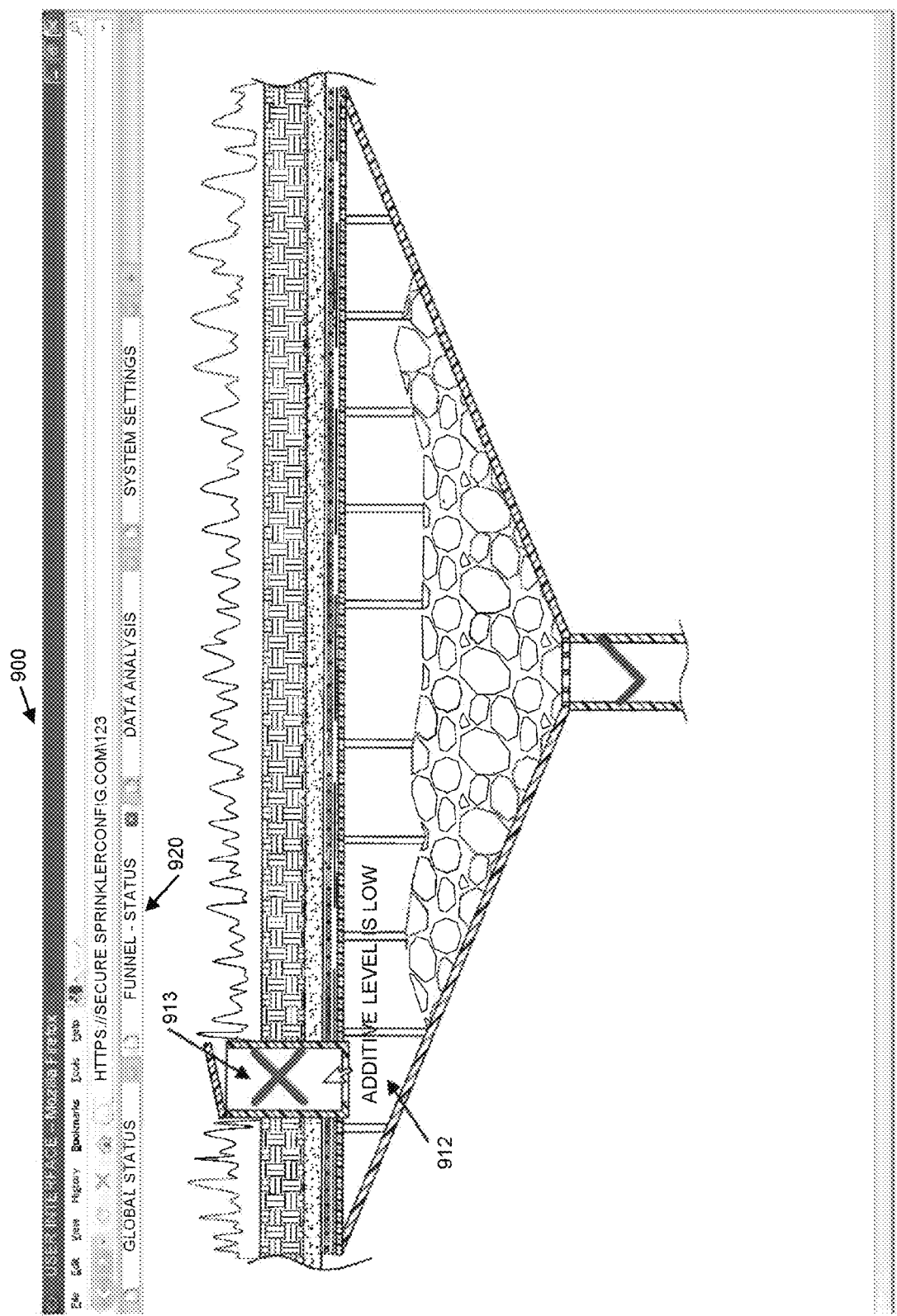
Figure 9C:
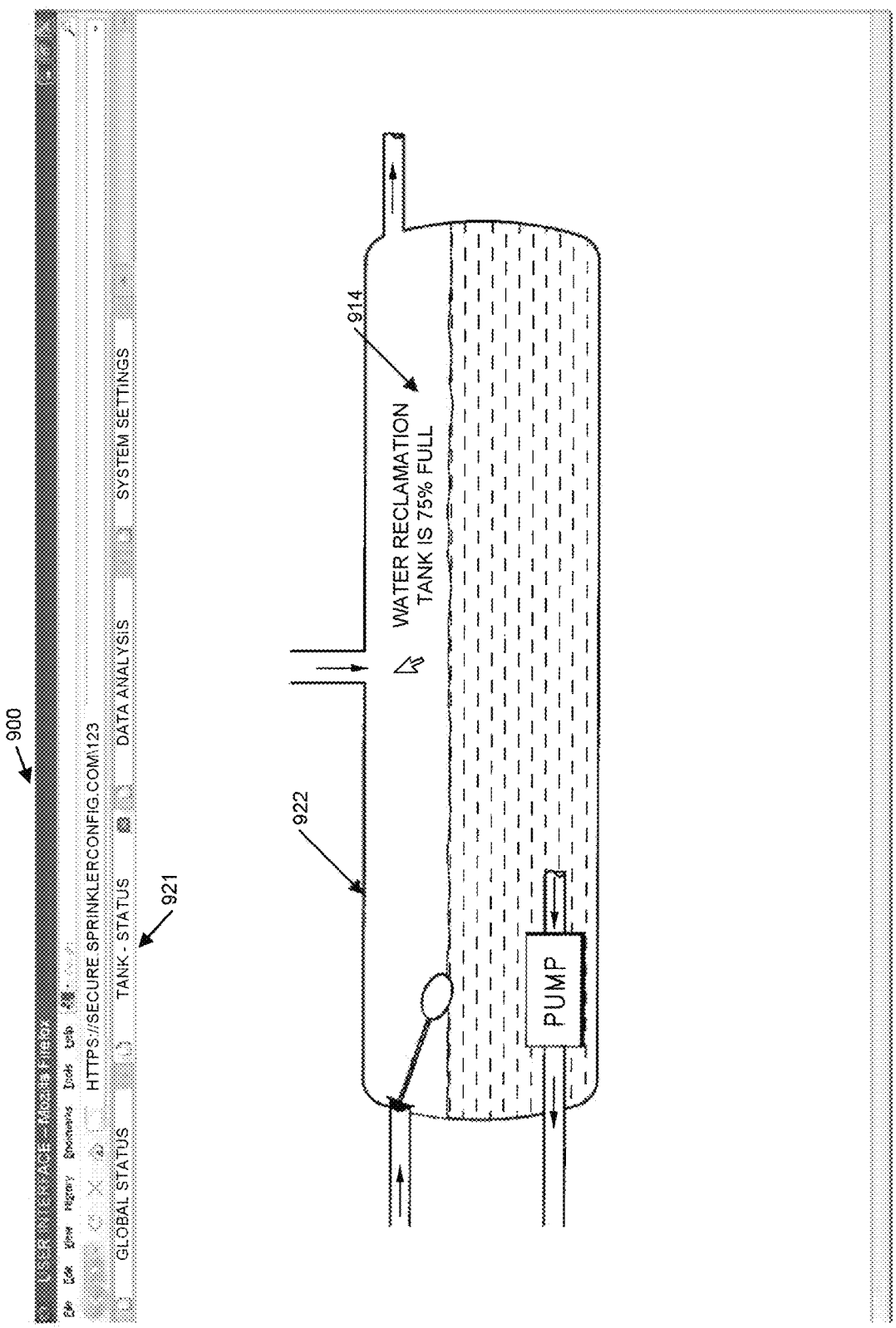

In one embodiment, by clicking on a section of system image 901, user interface engine 712 can present user 502 with a close-up view of the section selected by user 502. This close-up can be a more detailed depiction, or may be the same depiction on a larger scale. In one embodiment, user interface engine 712 replaces system image 901 with the close-up view. Alternatively, as depicted in FIG. 9B and FIG. 9C, user interface engine 712 can generate a new tab on user interface 900. Note that the close-up views may be schematic or pictorial. Further, the close-up views may include animations or videos from cameras associated with the sections or subsystems selected by user 502.

FIG. 9B illustrates a funnel status tab 920 associated with user interface 900. The funnel status tab 920 enables the user 502 to view the status of a funnel associated with water harvesting and reclamation system 540. FIG. 9C illustrates a tank status tab 921 associated with user interface 900. The tank status tab 921 enables the user 502 to view the status of a water reclamation tank associated with water harvesting and reclamation system 540. In one embodiment, user interface engine 712 creates a new tab for each element, system, or subsystem of water harvesting and reclamation system 540 that user 502 selects. Alternatively, user interface 900 has a limited number of tabs, such as one tab, reserved for more detailed status views. In this embodiment, if user 502 selects the funnel, user interface engine 712 will create funnel status tab 920. If user 502 then selects the water reclamation tank, user interface engine 712 will replace the funnel status tab 920 with the tank status tab 921. In one embodiment, user interface 900 can display multiple tabs simultaneously, such as in a side-by-side configuration.

In this embodiment, user interface engine 712 can present both funnel status tab 920 and tank status tab 921 to user 502 simultaneously.

In one embodiment, as illustrated in FIG. 9A and FIG. 9B, user 502 can quickly identify any problems with water harvesting and reclamation system 540 by looking at the status indicators, such as status indicators 902, 903, 904, 905, and 913. Note that although the status indicators are depicted as checkmarks (for functioning) and crosses or 'X's (for malfunctioning), the status indicators are not limited in form. For example, the status indicators can be circles or sad and happy emoticons. Further, the status indicators can be of any color and may even be flashing.

In one embodiment, various sections of water harvesting and reclamation system 540 can be different colors to indicate status. For example, water indicator 907 can be a bright blue color when the water in the water reclamation tank is clean or at a pre-defined pH or acidity level. Alternatively, water indicator 907 can be a muddy brown color when the water is dirty or outside a pre-defined pH or acidity range. As another example, water indicator 907 can be green when the water reclamation tank contains an amount of water above a threshold level and can be a flashing red when the amount of water is below a threshold level. Alternatively, the water indicator 907 can be one color that changes shades as the status of the water reclamation tank changes.

In one embodiment, the status indicators are associated with specific components of water harvesting and reclamation system 540. In one embodiment, the status indicators are associated with sections of water harvesting and reclamation system 540.

Alternatively, user 502 can determine the status of various sections or components of water harvesting and reclamation system 540 by moving a mouse pointer over the various sections or components, or by clicking on various sections or components of the various sections of water harvesting and reclamation system 540. For example, referring to FIG. 9B, by clicking or moving the mouse over status indicator 913, user interface engine 712 can generate tool tip 912, which informs user 502 that the additive level is low.

Note that the tool tips can include general status information and are not limited to error information. For example, referring to FIG. 9C, by clicking or moving over tank image 922, user interface engine 712 can generate tool tip 914, which informs user 502 that the water reclamation tank is 75% full. Those skilled in the art will recognize that user interface engine 712 can generate a dialog box or other display element to present the tool tip 912 and tool tip 914's data to user 502. In one embodiment, the clicking on or hovering of the mouse over the tank image generates a status request event, which, causes a status module of the user interface engine to be executed; instructions of the status module then determine the location of the cursor and then determine whether the location is within the displayed area of an active image, such as, for example, the tank image; in response to such determination, instructions of the status module then cause a query to be presented against the real-time datastore to retrieve the most recent stored data representing the water level in the reclamation tank 240; instructions of the status module then format the data into a displayable format and then display the data via the user interface. One of ordinary skill will appreciate that, in similar manner, various operating states of the components of the water harvesting and reclamation system may be requested and received via the user interface engine 712.

Figure 9D:
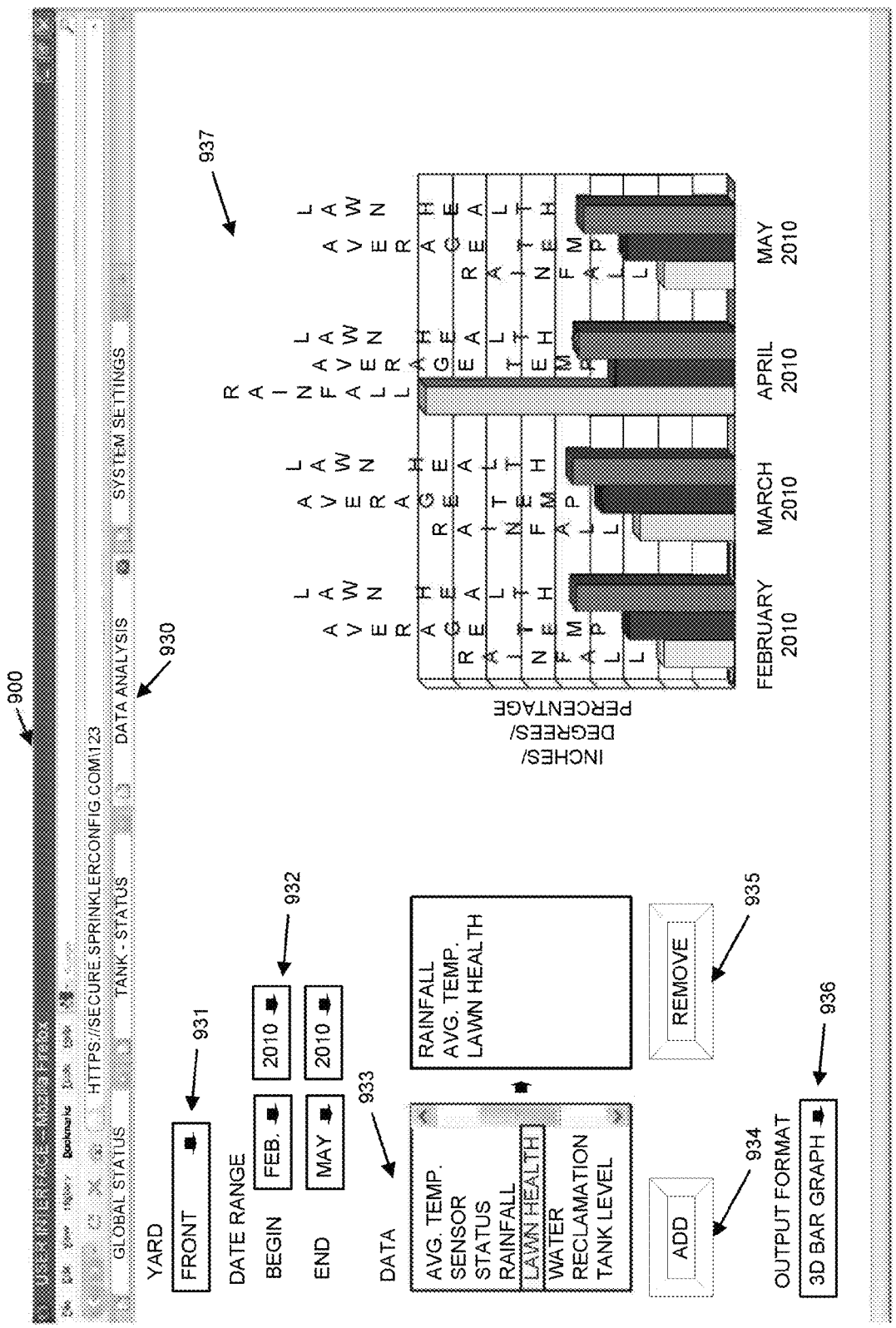

In one embodiment, user 502 can use user interface 900 to request historical data and/or statistical analysis of data collected by sprinkler management system 520. FIG. 9D illustrates an example of a data analysis tab 930 associated with user interface 900. Data analysis tab 930 can be configured to present user 502 with historical data, real-time data, and/or statistical data analysis. In one embodiment, data analysis tab 930 can include yard selector 931, date range selector 932, data selector 933, add button 934, remove button 935, and output format selector 936.

In the event that user 502 owns multiple water harvesting and reclamation systems, yard dropdown 931 enables user 502 to select which yard's data to analyze. In some embodiments, a request for a username and password would then be presented to the user, who would not be permitted access to the data unless the username and password combination are known to the system. In the example depicted in FIG. 9D user 502 has selected the front yard. Using yard selector 931, user 502 could select a different yard, or multiple yards. For example, if user 502 represents a town, user 502 could select the whole town, a specific town, or an individual house or yard using yard dropdown 931. Again, in some embodiments, username and password authentication may be required, and access would only be granted to yards for which the user is pre-authorized.

Using data range selector 932, user 502 can specify the date range for which user 502 desires data analysis. Although the date range selector 932 is depicted as having a granularity on the scale of months, one skilled in the art will recognize that date range selector 932 can have any level of granularity. For example, the granularity could be on the scale of days, or years.

Data selector 933 enables user 502 to select the data that user 502 wants displayed or analyzed. Using add button 934, user 502 can select the data to add to the generated output. Similarly, using remove button 935, user 502 can select data to remove from the generated output. One skilled in the art will recognize that the data that can be analyzed and displayed is extensive and is not limited by the options illustrated in FIG. 9D. For example, in embodiments that include an additive level sensor which is periodically read and for which data representative of the additive level is periodically stored in the real-time or historical datastore, data selector 933 can include an option to view the amount of additive present or consumed over the selected data range. As a second example, data selector 933 may include an option to view data indicative of occasions when conditions were present in the water harvesting and reclamation system to create a need for treatment by an additive.

Output format selector 936 enables user 502 to select in what format user interface 900 should present the data selected by user 502. For example, as illustrated by graph 937, the output format could be a three-dimensional bar graph. Alternatively, the output format can be a line graph, a spreadsheet of data, a histogram, a Venn diagram, or any other output format. One skilled in the art will recognize that only certain output formats will be appropriate for certain types of data analysis. Thus, user interface engine 712 can limit the formats user 502 can select using format selector 936 based on the data user 502 selected using data selector 933.

One skilled in the art will recognize that the various input and output elements associated with user interface 900 are examples and that substitute elements may be used. For example, date range selector 932 may implement a calendar-based selector, and yard selector 931 can include a series of checkboxes or a text field.

Figure 9E:
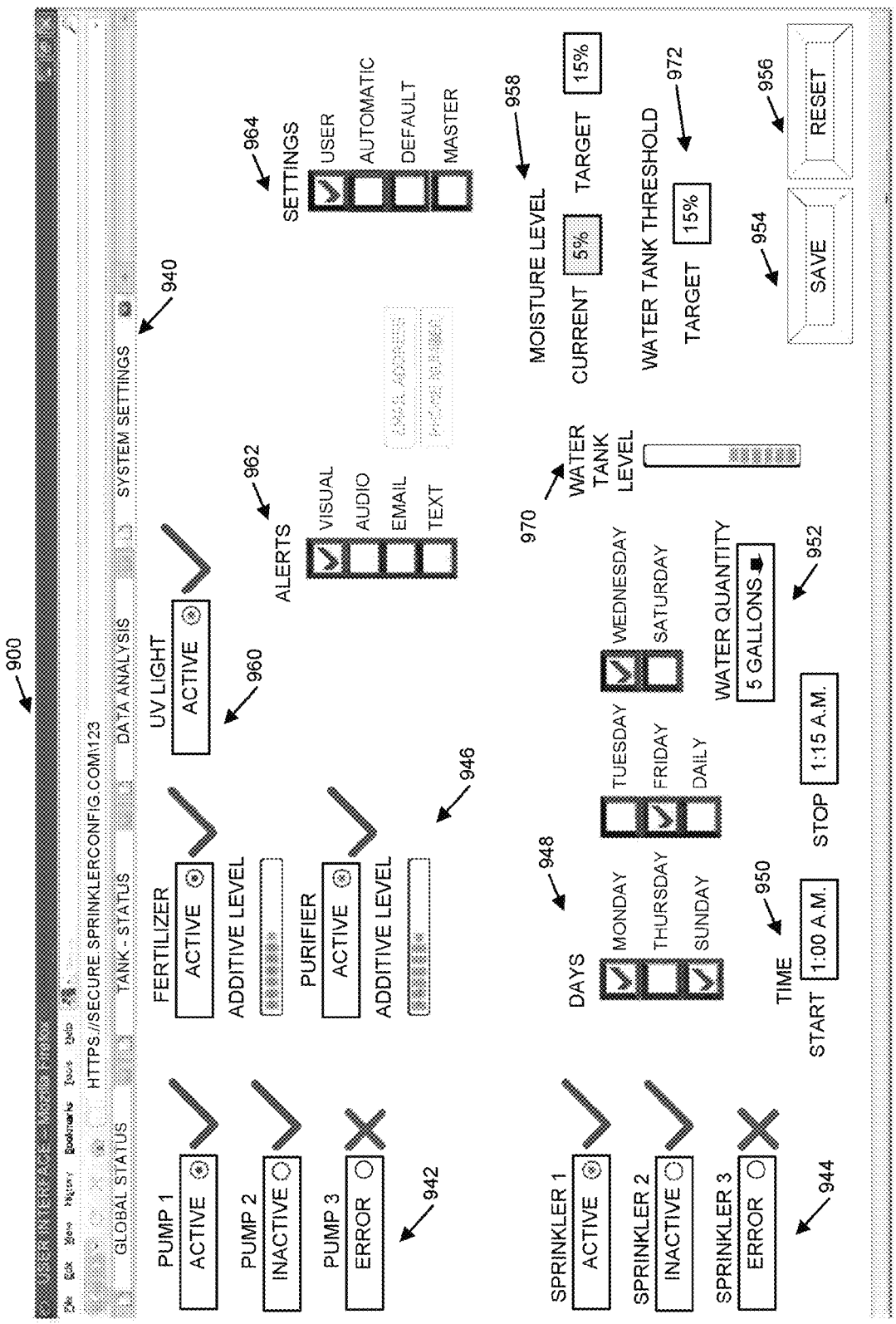

FIG. 9E illustrates an example system settings tab 940 associated with user interface 900. System settings tab 940 can include a wide number of settings and options. As one option, in some embodiments, such settings include authorizing additional users by providing username and initial password combinations and associating each with the water harvesting and reclamation systems to which the user will have access. Further, system settings tab 940 can include status information to facilitate user 502 configuring water harvesting and reclamation system 540, as an additional option to inform user 502 of water harvesting and reclamation system 540's status, and to provide user 502 with supplemental status information.

In one embodiment, system settings tab 940 includes: pump activation settings 942; sprinkler activation settings 944; water tank level indicator 970; water tank threshold level setting 972; sprinkler day settings 948; sprinkler time settings 950; water quantity setting 952; additive settings 946; UV light setting 960; alert settings 962; system settings 964; moisture level setting 958; save button 954, and reset button 956. Note that many of these settings include status information. In some embodiments, some of the settings are mutually exclusive.

Pump activation settings 942 enable user 502 to specify whether to activate one or more pumps associated with water harvesting and reclamation system 540. These pumps may be associated with water reclamation tanks, or may be associated with other features and embodiments of water harvesting and reclamation system 540. As illustrated, pump activation settings 942 can indicate the pump activation status as well as whether the pump is malfunctioning. Further, as illustrated, user 502 can select one or more pumps to activate by clicking on a radio button associated with the pump.

Sprinkler activation settings 944 enable user 502 to specify whether to activate one or more sprinklers associated with water harvesting and reclamation system 540. These sprinklers may be activated separately or in conjunction with corresponding pumps. Note that multiple sprinklers may be associated with a single pump if, for example, a single water reclamation tank feeds multiple sprinklers. As illustrated, sprinkler activation settings 944 can indicate the sprinkler activation status as well as whether the sprinkler is malfunctioning. Further, as illustrated, user 502 can select one or more sprinklers to activate by clicking on a radio button associated with the sprinkler.

In some embodiments, selecting a pump to activate automatically causes one or more corresponding sprinklers to be selected for activation. In some embodiments, selecting a sprinkler to activate automatically causes corresponding pumps to be selected for activation.

Sprinkler days settings 948 enable user 502 to specify which days to run the sprinklers. Similarly, sprinkler time settings 950 enable user 502 to specify what time to run the sprinklers, as well as for how long. Typically, the pumps run substantially simultaneously with the sprinklers. However, in one embodiment, user 502 can specify different days and times to run the pumps. For example, if the water harvesting and reclamation system 540 includes multiple water reclamation tanks, the user 502 may alternate which pump to use. As a second example, if the sprinklers are configured to draw directly from a fresh water source, user 502 may choose not to activate the pumps on days when the water reclamation tanks have a low water level. However, as has been previously described, generally any fresh water sources will also flow into the water reclamation tanks. Thus, even when using a fresh water source, the pumps will usually run substantially simultaneously with the sprinklers.

Water quantity settings 952 enable user 502 to specify how much water should be released through the sprinklers each time the sprinklers are activated. In one embodiment, user 502 specifies a start and stop time using sprinkler time settings 950 or specifies a start time using sprinkler time settings 950 and a water quantity using water quantity settings 952.

Alternatively, the user 502 may specify both a start and stop time using sprinkler time settings 950 and a water quantity using water quantity settings 952. In this embodiment, sprinkler management system 520 can deactivate the sprinklers when the stop time is reached or when the water quantity has been distributed, whichever occurs first, or alternatively, whichever occurs last. In one embodiment, sprinkler management system 520 can regulate the flow of water to ensure that completion of the application of the specified water quantity coincides with the specified stop time.

Additive settings 946 enable user 502 to specify whether to add additives to water harvesting and reclamation system 540. These additives may be added to various sections of water harvesting and reclamation system 540. For example, the additives can be added to a water reclamation tank associated with water harvesting and reclamation system 540. In one embodiment, user 502 can specify where to add the additives. In other embodiments, the location that the additives are added or used is predetermined by the configuration of water harvesting and reclamation system 540.

As illustrated, additive settings 946 can indicate the additive activation status as well as any errors associated with the additive system, such as whether the additive insertion mechanism is malfunctioning or whether the additive system is empty or running low. Further, as illustrated, additive settings 946 can indicate the level of additive remaining.

In one embodiment, the additive systems are automatically activated when corresponding pumps and/or sprinklers are activated. In one embodiment, user 502 can schedule the activation of additive systems to coincide with the scheduling of the pumps and/or sprinklers activation. Alternatively, user 502 can schedule the additive systems to activate independently of the pumps and/or sprinklers. This embodiment is useful for additives that are used more sparingly than the frequency the sprinklers and/or pumps are activated, such as is often the case with fertilizer.

UV light settings 960 enable a user to specify whether to activate UV light to help cleanse or disinfect water associated with water harvesting and reclamation system 540. As illustrated, UV light settings 960 can indicate the UV light activation status as well as any errors associated with the UV light system. Similar to the additive and/or sprinkler scheduling described above, user 502 can also schedule the activation of the UV light system using user interface 900.

Water tank level indicator 970 can be used to display to the user an indication of the amount of water in a water reclamation tank associated with water harvesting and reclamation system 540. Note that the water tank level indicator 970 can change colors or flash as the level reaches various thresholds.

Water tank threshold setting 972 enables a user 502 to specify a target quantity of water for a water reclamation tank associated with water harvesting and reclamation system 540. If the water reclamation tank level falls below the user specified threshold, sprinkler management system 520 can activate a fresh water source to fill the water reclamation tank to: 100%, the user-specified threshold, or a second user-specified threshold that differs from water tank threshold setting 972.

Moisture level setting 958 enables a user 502 to determine the current moisture level of the yard. Using this information, user 502 can modify the water harvesting and reclamation system 540 settings. User 502 can also use moisture level settings 958 to set a target moisture level for the yard. In one embodiment, sprinkler management system 520 can automatically adjust settings associated with water harvesting and reclamation system 540 to achieve the target moisture level. In one embodiment, user 502 can specify how quickly sprinkler management system 520 should reach the target moisture level.

Alert settings 962 enables user 502 to specify whether and how user 502 would like to receive systems status alerts. Note that user 502 may select multiple alert options. In some embodiments, alerts may generated when a water harvesting and reclamation system uses a quantity of water that exceeds, in a certain time period such as a week, month or year, a predetermined level or a level set by a master user. Other alerts may include system malfunctions or failures, such as potential blockages detected as when a pump is activated but one or more flow sensors indicate that water is not flowing, or when moisture sensors indicate a serious moisture inadequacy in one area but abundant moisture in other areas. Alerts may also include warnings displayed when system conditions will not support irrigation but the system is programmed to initiate irrigation within a certain time, such as in 12 hours or less, for example the level of water in the reclamation tank 240 may be too low, and the pump may be damaged when run without adequate water in the system.

System settings 964 enables user 502 to specify whether to use user-generated settings, automatic settings determined by sprinkler management system 520, pre-determined default settings, or master settings. Master settings are settings that may be selected by an outside water management source administrator, such as a town or homeowners association. In one embodiment, the user 502 cannot override the master setting. In other embodiments, the master setting is a suggested, non-mandatory setting.

Save button 954 enables user 502 to save a configuration created using user interface 900. Reset button 956 enables user 502 to reset the configuration to the previously saved configuration or to a default configuration. In one embodiment, user 502 can save multiple configurations. In this embodiment, user 502 can select a configuration to run from a menu associated with user interface 900. In some embodiments, user 502 can schedule different configurations to run at different times.

It should be noted that system settings tab 940 is just one example embodiment and that system settings tab 940 can include a number of additional settings and options. For example, settings tab 940 can include an option to split the sprinkler activation period into two periods each day, such as once at night and once in the morning. Further, the various disclosed input and output elements are only intended as examples and not to be limiting. Various alternative input and output elements can be used. For example, text boxes can be substituted for dropdown boxes and sliders can be substituted for text boxes.

Watering Process

Figure 10:
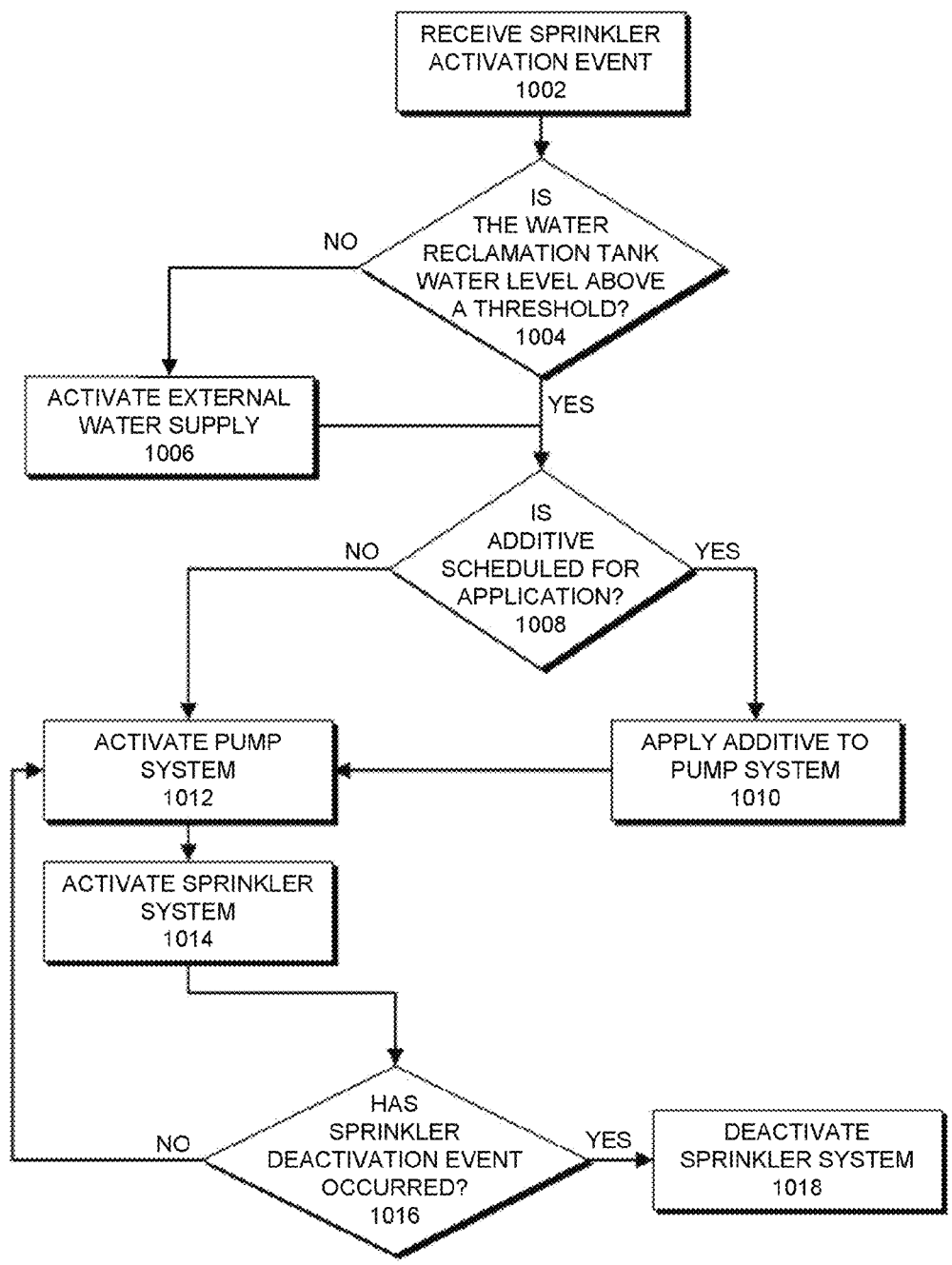
FIG. 10 presents an example flow for a watering process using a water harvesting and reclamation system.

FIG. 10 presents an example flow for a watering process using a water harvesting and reclamation system 540 and a sprinkler management system 520. At block 1002, the sprinkler management system 520 receives a sprinkler activation event. In one embodiment, user 502 sends the event to the sprinkler management system 520 via a user interface 900 accessed on client 512. Alternatively, the sprinkler management system 520 generates the sprinkler activation event in response to an external event pre-identified by the user 502. For example, the user 502 could have pre-configured the sprinkler management system 520 to generate a sprinkler activation event every night at 11:00 P.M., or every time a moisture reading associated with the land being irrigated by the water harvesting and reclamation system 540 drops below a threshold value.

At decision block 1004, the sprinkler management system 520 determines if the water level for the reclamation tank(s) associated with the water harvesting and reclamation system 540 contains water above a threshold level. Generally, the threshold level is pre-determined based on the amount of water required for each sprinkler, or water application cycle. For example, the threshold level may correspond to one or some multiple of the amount of water required for one water application cycle. In some embodiments, the threshold may be below the amount of water required for one water application cycle. Such a threshold may be selected if a heavy rain fall is expected soon, or if the water harvesting and reclamation system 540 is reclaiming water quickly enough that sufficient water will exist in the water reclamation tank before the water application cycle completes.

If the sprinkler management system 520 determines that the water reclamation tank water level is not above the threshold, then the sprinkler management system 520 activates an external water supply to supplement the water in the water reclamation tank (block 1008). Once the water reclamation tank water level reaches a threshold level, the sprinkler management system 520 can deactivate the external water supply. Note that in some embodiments the threshold for activating the external water supply and the threshold for deactivating the external water supply may differ. This difference may exist due to an expectation that more or less water is anticipated to be collected from the environment.

Optionally, at decision block 1008, sprinkler management system 520 determines if an additive is scheduled for application to the water in the water reclamation tank, or to the land being watered. Note that this operation may also involve the sprinkler management system 520 determining if a sufficient level of additive exists in the additive storage chamber and if not initiating an error process similar to that described below in relation to FIG. 12 to alert the user 502 that more additive must be added to the additive storage chamber. If the sprinkler management system 520 determines that an additive is scheduled for application, the sprinkler management system 520 applies the additive to the pump system associated with the water harvesting and reclamation system 540 (block 1010). Alternatively, block 1010 may involve: applying the additive to a water reclamation tank associated with the water harvesting and reclamation system 540; applying the additive to the pipe system associated with the water harvesting and reclamation system 540; activating a UV light source; or any other process appropriate for the selected additive.

At block 1012, sprinkler management system 520 activates the pump system associated with the water harvesting and reclamation system 540. This pumps the water from the water reclamation tank into the pipes leading to the sprinkler. An example of this flow can be seen in FIG. 2 with respect to pump 270, recycled irrigation pipe 275 and sprinklers 202. At block 1014, sprinkler management system 520 activates the sprinkler system associated with the water harvesting and reclamation system 540.

At decision block 1016, sprinkler management system 520 determines if a sprinkler deactivation event has occurred. In one embodiment, the sprinkler deactivation event can include: receiving a command from user 502, entered via a user interface 900 accessed on client 512; the expiration of a pre-defined time period; the application of a pre-defined volume of water to the land being watered; a moisture reading associated with the land being watered exceeding a threshold; or any other event that can be used to trigger deactivation of the sprinkler system. If the deactivation event has occurred, sprinkler management system 520 deactivates the sprinkler system at block 1018. Note that deactivating the sprinkler system may also include deactivating the pump system.

Sprinkler System Configuration

Figure 11:
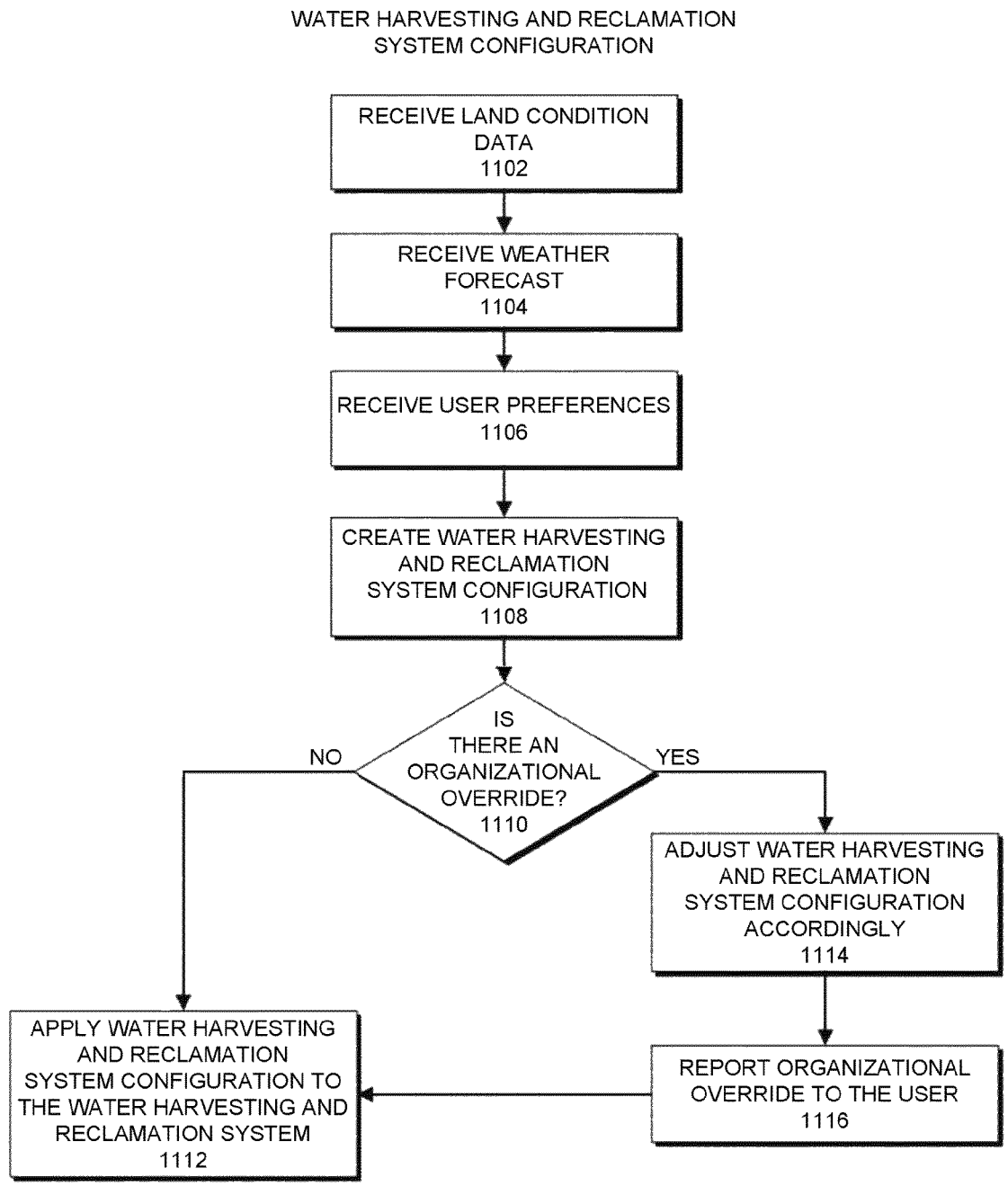
FIG. 11 presents an example flow for configuring a water harvesting and reclamation system.

FIG. 11 presents an example flow for configuring a water harvesting and reclamation system 540. Optionally, at block 1102, sprinkler management system 520 receives land condition data from database 530. In one embodiment, the land condition data can include a moisture reading, an acidity reading, a mineral analysis, or any other data that can indicate the suitability of the land for a pre-defined type of vegetation.

Optionally, at block 1104, sprinkler management system 520 receives a weather forecast from a server 560 associated with a weather forecast system. Alternatively, sprinkler management system 520 can obtain the weather forecast from database 530.

At block 1106, sprinkler management system 520 receives a set of user preferences from user 502 via a user interface 900 accessed on client 512. In one embodiment, the set of user preferences can include: what day(s) to activate the sprinkler system; what time(s) to activate the sprinkler system on any given day; which sprinklers to activate, what additives, if any, to apply to the water harvesting and reclamation system 540; whether to use a fresh water source if the water in the water reclamation tank drops below a threshold; what threshold level to use; what quantity of water to use per irrigation cycle, or, in other implementations, how long to run the sprinkler system; whether to modify the configuration based on land condition data; whether to modify the configuration based on a weather forecast; and any other preference the user desires to specify in relation to the water harvesting and reclamation system 540.

Sprinkler management system 520 creates a water harvesting and reclamation system configuration at block 1108 based on the land condition data, the weather forecast, and the user preferences. If both the land condition data and the weather forecast are unavailable, or if the user specifies that the sprinkler management system 520 should ignore such data, the sprinkler system configuration will match the user preferences.

At decision block 1110, sprinkler management system 520 determines if an organizational override exists, such as, for example, settings provided by a "master" level user to temporarily suspend a programmed watering schedule. If so, sprinkler management system 520 adjusts the water harvesting and reclamation system configuration accordingly (block 1114). The sprinkler management system 520 then reports the organizational override to user 502 via the user interface 900 on client 512 (block 1116). Block 1116 may involve displaying a message on a screen associated with client 512, activating an audio signal, emailing or texting user 502, or any other method of alerting a user 502 of the existence of an organizational override. In one embodiment, the organizational override may be created by a town, a metropolitan water district, a water company, a home owners association, or any other organization that has the authority to override or limit the user 502's sprinkler configuration preferences. In one embodiment, the organizational override can include the setting or restricting or temporary override of any preferences which user 502 can specific via user interface 900.

At block 1112, sprinkler management system 520 applies the water harvesting and reclamation system configuration to water harvesting and reclamation system 540. Note that this water harvesting and reclamation system configuration can either be the configuration created at block 1108 or the configuration modified at block 1114 depending on the outcome of block 1110.

In one embodiment, the processes described with relation to blocks 1110, 1114, and 1116 may not occur because either the relevant organization did not set any limitations on the use of the water harvesting and reclamation system 540 or because user 502 lives in a region where no organization has authority to limit water use or the use of water harvesting and reclamation system 540. In such a case, sprinkler management system 520 applies the water harvesting and reclamation system configuration created at block 1108 to water harvesting and reclamation system 540.

Monitoring the Status of a Water Harvesting and Reclamation System

Figure 12:
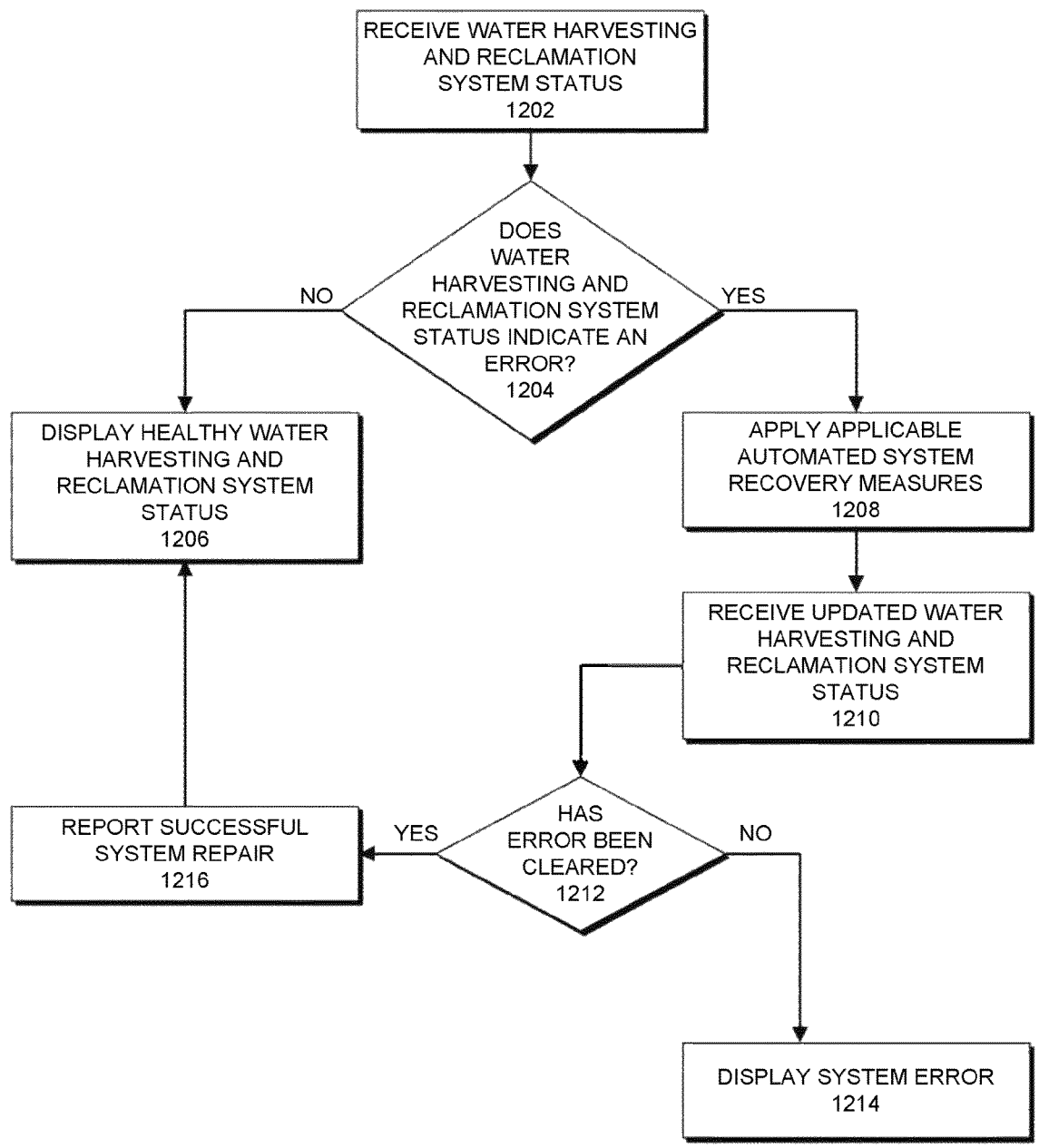
FIG. 12 presents an example flow for monitoring the status of a water harvesting and reclamation system.

FIG. 12 presents an example flow for monitoring the status of a water harvesting and reclamation system 540. At block 1202, sprinkler management system 520 receives the water harvesting and reclamation system 540's status. In one embodiment, the status can be for the water harvesting and reclamation system 540 as a whole. In another embodiment, the status can include information on the status of each subpart of water harvesting and reclamation system 540 for which signals received from one or more sensors may be indicative of a normal or abnormal operating state.

In one embodiment, sprinkler management system 520 receives the water harvesting and reclamation system 540's status on a continual or periodic basis. In another embodiment, sprinkler management system 520 receives the water harvesting and reclamation system 540's status at a predetermined time. Alternatively, sprinkler management system 520 receives the harvesting and reclamation system 540's status in response to a request from user 502.

At decision block 1204, sprinkler management system 520 determines if the water harvesting and reclamation system 540's status indicates an error. An error may be associated with a fault or potential fault with water harvesting and reclamation system 540. In one embodiment, a sensor associated with a subpart of water harvesting and reclamation system 540 reports a value that is out of the normal or expected range of values generated by the sensor. In one embodiment, sprinkler management system 520 derives status information based on the sensor data. For example, referring to FIG. 9A, suppose that water harvesting and reclamation system 540 includes sensors at status points 902, 903, and 904. Further, suppose that status point 905 does not include a sensor. If the sensors at status points 902, 903, and 904 report normal signal ranges indicative of flow, and if the water flow at status point 904 is less than the sum of the flow recorded at status points 902 and 903, then sprinkler management system 520 can determine that there may be a problem condition at status point 905, despite the lack of a sensor reading. Further, sprinkler management system 520 can determine that the error may be a clog in the pipe somewhere between status point 902 and 904.

If sprinkler management system 520 determines that the water harvesting and reclamation system 540's status does not indicate an error, the sprinkler management system 520 causes user interface 900 to display a healthy water harvesting and reclamation system 540 status to user 502 at client 512 (block 1206). In one embodiment, sprinkler management system 520 sends the status information to database 530. In one embodiment, sprinkler management system 520 causes user interface 900 to display the water harvesting and reclamation system 540 status in response to a request from user 502. In this embodiment, sprinkler management system 520 may determine the status of water harvesting and reclamation system 540 subsequent to receiving the request from user 502. Alternatively, sprinkler management system 520 may obtain the status information from database 530. This may occur in response to user 502's request or because sprinkler management system 520 recently determined water harvesting and reclamation system 540's status.

If sprinkler management system 520 determines that the water harvesting and reclamation system 540's status includes an abnormal condition, sprinkler management system 520 can apply automated system recovery measures (block 1208). These measures are dependent on the error detected. For example, if sprinkler management system 520 detects a low water level in the water reclamation tank, it may activate filling from an external water source. As a second example, if sprinkler management system 520 detects a pipe blockage, it may temporarily increase the force from a pump in an effort to dislodge the blockage. Alternatively, sprinkler management system 520 may cause the release of a pipe cleansing fluid in an attempt to dissolve the blockage. In another example, sprinkler management system 520 may attempt to clear the error by cycling power to various subsystems and sensors in an attempt to reboot any associated hardware that may be malfunctioning or falsely reporting an abnormal or out-of-range signal.

At block 1210, sprinkler management system 520 receives an updated water harvesting and reclamation system status. Then at decision block 1212, sprinkler management system 520 determines if the abnormal condition has been cleared. If so, sprinkler management system 520 reports a successful system repair to user 502 via user interface 900 at client 512 (block 1216). If the error has not been cleared, sprinkler management system 520 causes a system error to be displayed to user 502 via user interface 900 at client 512 (block 1214). In one embodiment, displaying an error can involve: marking an error location with a visual indicator, such as a red "X"; scrolling text across user interface 900; causing a sound to be played; altering the color of user interface 900; sending an email or text to user 502, or any other method for displaying a system error known to those skilled in the art. In one embodiment, the system error can include information about the suspected cause of the error as well as suggested methods of resolving the error.

In one embodiment, block 1208 is optional. In this embodiment, the processes described with respect to blocks 1210, 1212, and 1216 may still occur in response to user 502's corrective actions. For example, if user 502 applies a liquid pipe clearer to a pipe that is marked as having a problem, sprinkler management system 520 may then perform the processes associated with blocks 1210, 1212, and 1216.

In one embodiment, if sprinkler management system 520 determines at decision block 1212 that the error has been cleared, sprinkler management system 520 may return to block 1204 to determine if additional errors still exist, or if hidden errors can now be identified. In this embodiment, hidden errors are errors associated with problems that existed in water harvesting and reclamation system 540 that could not be detected until previously existing problems were resolved.

A variety of embodiments have been disclosed herein, many of which take advantage of available components and known approaches in order to implement new innovative systems in accordance with the disclosed novel subterranean water recapture and recycling systems and methods. Although the foregoing has been described in terms of certain preferred or preferable embodiments, other embodiments are or will become obvious to those of ordinary skill in view of these disclosures. Accordingly, the present inventions are not intended to be limited by the recitation of embodiments, preferred or otherwise, and include all substantial equivalents. Further, the headings that appear above are navigational aids only and are not intended to limit the present inventions.

The beneficiaries of systems according to this disclose include the environment, users, and the water provider. The water provider benefits by lower demand for expensive fresh water supplies. For example, if the water provider is a city or city agency, it may benefit by lowered cost and resource requirements to provide fresh water to the city. Users, such as homeowners and landowners, benefit from lowered water costs and greater protection of environmentally sensitive areas that may be near them. The benefits to the environment itself, as previously discussed, include reduced storm drain runoff, lower impact from runoff on existing bodies of water and other ecosystems and less tapping of existing water supplies to divert the freshwater for landscape use.

What is claimed is:

1. A method for managing irrigation systems, the method comprising:
   receiving first irrigation status data representative of at least one irrigation performance characteristic of a first irrigation system that comprises a first drain structure below a first area of land to guide water into a first tank and also comprises a first pump to transport water from the first tank to irrigate the first area of land;
   using the first irrigation status data to generate first displayable status data on a display screen of a processor-based control device, the first displayable status data indicative of the at least one irrigation performance characteristic of the first irrigation system;
   receiving second irrigation status data representative of at least one irrigation performance characteristic of a second irrigation system that comprises a second drain structure below a second area of land to guide water into a second tank and also comprises a second pump to transport water from the second tank to irrigate the second area of land;
   using the second irrigation status data to generate second displayable status data on the display screen, the second displayable status data indicative of the at least one irrigation performance characteristic of the second irrigation system;
   receiving from a first user at a user interface of the processor-based control device an irrigation modification request to modify irrigation system settings for the first irrigation system;
   determining based on user identification data for the first user that the first user is authorized to execute the irrigation modification request;
   presenting to the first user at the user interface a present value of each of a plurality of irrigation system settings; and
   accepting from the first user at the user interface a new value in place of the present value for at least one of the plurality of irrigation system settings.

2. The method of claim 1, wherein the first displayable status data comprise a graphical image illustrating a representation of one or more components of the first irrigation system and also illustrating an operating condition of at least one of the one or more components of the first irrigation system.

3. A method for managing irrigation systems, the method comprising:
   receiving first irrigation status data representative of at least one irrigation performance characteristic of a first irrigation system that comprises a first drain structure below a first area of land to guide water into a first tank and also comprises a first pump to transport water from the first tank to irrigate the first area of land;
   using the first irrigation status data to generate first displayable status data on a display screen of a processor-based control device, the first displayable status data indicative of the at least one irrigation performance characteristic of the first irrigation system,
   receiving second irrigation status data representative of at least one irrigation performance characteristic of a second irrigation system that comprises a second drain structure below a second area of land to guide water into a second tank and also comprises a second pump to transport water from the second tank to irrigate the second area of land;
   using the second irrigation status data to generate second displayable status data on the display screen, the second displayable status data indicative of the at least one irrigation performance characteristic of the second irrigation system;
   storing the first irrigation status data in an irrigation system database;
   storing the second irrigation status data in the irrigation system database;
   accessing the first and second irrigation status data from the irrigation system database; and
   based on the accessed first and second irrigation status data, automatically presenting on the display screen one or more recommended modifications to the irrigation system settings of the first irrigation system.

4. The method of claim 3, wherein the first displayable status data comprise a graphical image illustrating a representation of one or more components of the first irrigation system and also illustrating an operating condition of at least one of the one or more components of the first irrigation system.

* * * * *